(12) United States Patent
Hamagishi

(10) Patent No.: US 6,304,288 B1
(45) Date of Patent: Oct. 16, 2001

(54) HEAD POSITION DETECTING DEVICE AND HEAD TRACKING STEREOSCOPIC DISPLAY

(75) Inventor: Goro Hamagishi, Toyonaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/084,345

(22) Filed: May 27, 1998

(30) Foreign Application Priority Data

May 27, 1997 (JP) .................................................. 9-137158
May 30, 1997 (JP) .................................................. 9-142682

(51) Int. Cl.$^7$ .................................................. H04N 13/00
(52) U.S. Cl. .................................................. 348/53; 348/59
(58) Field of Search .................................... 348/53, 59, 51, 348/52, 54–58, 42; 345/7, 6, 139; 349/5; 359/619, 630, 9, 631, 633; H04N 13/00

(56) References Cited

U.S. PATENT DOCUMENTS

| | | | |
|---|---|---|---|
| 4,959,641 | * | 9/1990 | Bass et al. ............................ 345/139 |
| 4,987,487 | * | 1/1991 | Ichinose et al. ...................... 348/59 |
| 5,349,379 | * | 9/1994 | Eichenlaub .......................... 348/59 |
| 5,410,345 | * | 4/1995 | Eichenlaub .......................... 348/54 |
| 5,428,366 | * | 6/1995 | Eichenlaub .......................... 348/59 |
| 5,457,574 | * | 10/1995 | Eichenlaub .......................... 359/619 |
| 5,493,427 | * | 2/1996 | Nomura et al. ....................... 349/5 |
| 5,546,120 | * | 8/1996 | Miller et al. ......................... 348/59 |
| 5,581,378 | * | 12/1996 | Kulick et al. ......................... 359/9 |
| 5,712,732 | * | 1/1998 | Street ................................... 359/630 |
| 5,726,800 | * | 3/1998 | Ezra et al. ............................ 348/51 |
| 5,757,522 | * | 5/1998 | Kulick et al. ......................... 359/9 |
| 5,866,675 | * | 3/1999 | Aye et al. ............................. 345/7 |
| 5,945,965 | * | 8/1999 | Inoguchi et al. ..................... 345/6 |
| 5,949,583 | * | 9/1999 | Rallison et al. ...................... 359/631 |

FOREIGN PATENT DOCUMENTS

| | | |
|---|---|---|
| 0602934A2 | 6/1994 | (EP) . |
| 0721131A2 | 7/1996 | (EP) . |
| WO94/06249 | 3/1994 | (WO) . |

* cited by examiner

*Primary Examiner*—Richard Lee
(74) *Attorney, Agent, or Firm*—Arent Fox Kintner Plotkin & Kahn, PLLC

(57) ABSTRACT

A head tracking stereoscopic display includes a first combining light source composed of two line-shaped light sources and a second combining light source composed of two line-shaped light sources. The first combining light source is used when the head of a viewer is shifted a distance between the eyes E in a horizontal direction on the basis of a predetermined position. The second combining light source is used when the head of the viewer is shifted a distance between the eyes E in the horizontal direction on the basis of a position that shifts E/2 from the predetermined position. When the first combining light source is selected, the two line-shaped light sources in the first combining light source are alternately turned on and off. When the second combining light source is selected, the two line-shaped light sources in the second combining light source are alternately turned on and off. A right eye image and a left eye image are alternately displayed in synchronization with the alternate ON/OFF on an image display panel. The control that changes the timing at which the images are alternately displayed and the control that selects the combining light source is carried out based on the detected head position determined by a head position detector.

32 Claims, 31 Drawing Sheets one-eye system I one-eye system II

HEAD POSITION DETECTING DEVICE AND HEAD TRACKING STEREOSCOPIC DISPLAY

BACKGROUND OF THE INVENTION

1. Field of the Invention

The present invention relates generally to a stereoscopic display requiring no special glasses, and more particularly, to a head tracking three-dimensional (3D) display so adapted that a viewer can properly view a three-dimensional (3D) image even if the head of the viewer moves by detecting the position of the head of the viewer. Further, the present invention relates to a head position detecting device capable of detecting, when the viewer views a 3D image without requiring special glasses, the position of the head of the viewer, to enlarge the stereoscopic area.

2. Description of the Prior Art

As a stereoscopic display requiring no special glasses, a system using a parallax barrier and a system using a lenticular lens have been known. In such a stereoscopic display, however, the stereoscopic area is narrow.

Therefore, a stereoscopic display so adapted as to detect the position of the head of a viewer, to optically make correction depending on the head position has been conventionally known.

In a head tracking stereoscopic display shown in FIG. 31, a right eye image and a left eye image are respectively displayed on liquid crystal display (LCD) panels for image display 701 and 702, a right half image of a viewer which is picked up by an imaging device 703 and an image obtained by negative-positive inversion of the right half image in an image processing device 704 are respectively displayed on viewer image display devices 705 and 706 each composed of an LCD panel for back-light, for example, the viewer image display devices 705 and 706 are respectively used as illuminating devices for displaying right and left eye images, and the right eye image and the left eye image which are synthesized are respectively viewed with only the right eye and the left eye of the viewer, by Fresnel lenses 707 and 708 which have directional properties and a half mirror 709.

Specifically, a portion where a viewer image is displayed in the viewer image display device 705 emits light, so that the light emitting portion becomes right eye illuminating light, while a portion where a viewer image is displayed in the viewer image display device 706 emits light, so that the light emitting portion becomes left eye illuminating light, and the positions of both the light emitting portions are changed by following the position of the viewer. Therefore, the positional limitation of the viewer for stereoscopic view is reduced.

In the above-mentioned conventional head tracking stereoscopic display, an imaging device and the display devices to be a light source are required, however, the structure of a back-light is complicated, and the cost is high.

An example of the conventional head position detecting device is one, having a device mounted on a viewer for producing a magnetic force, adapted so as to detect the position of the viewer by grasping the position where the magnetic force is produced using a magnetic sensor. If the position of the viewer is detected using the magnetic sensor, however, the scale of the head position detecting device becomes large, and the cost thereof becomes comparatively high.

SUMMARY OF THE INVENTION

The present invention has been made in view of the above-mentioned circumstances, and has for its object to provide a head tracking stereoscopic display so adapted that a 3D image can be properly viewed even if the head of a viewer moves while simplifying the structure of a back-light, and also has for its object to provide a head position detecting device capable of detecting the position of a viewer in simple construction and a head tracking stereoscopic display comprising the head position detecting device.

A head tracking stereoscopic display according to the present invention is characterized by comprising a light emitting means comprising at least two light sources each comprised of a set of two line-shaped light sources for one of the eyes and the other eye, the two light sources being for a first area and a second area in a position shifted by approximately E/2 (E is the distance between the eyes of a viewer) in the horizontal direction from the first area, a diffusing screen provided on the light emission side of the light emitting means, a first lenticular lens screen provided between the diffusing screen and the light emitting means for focusing light from the selected one of the light sources and alternately forming bright portions and dark portions on the diffusing screen by semi-cylindrical lens portions constituting the first lens screen, a second lenticular lens screen provided on the light emission side of the diffusing screen and having the function of taking each of the bright portions formed on the diffusing screen as a light source for either one of the eyes, an image display panel provided on the light emission side of the second lenticular lens screen, light source control means for alternately turning one of the line-shaped light sources and the other line-shaped light source in the selected one light source on and off, display control means for alternately displaying one of the images and the other image which have binocular parallax on the image display panel in synchronization with the alternate ON/OFF of the line-shaped light sources, head position detection means for detecting the position of the head of the viewer, and control means for suitably carrying out such control as to change the timing of the alternate display of the images and select the light source on the basis of information relating to the head position from the head position detection means.

In such construction, the light emitting means is constituted by the four line-shaped light sources, the first lenticular lens screen, the diffusing screen, and the second lenticular lens screen, so that the construction can be made simpler and the cost can be made lower, as compared with a conventional light emitting means which is constituted by a combination of an imaging device and an image display device. Even when the viewer moves from a stereoscopic position to a pseudostereoscopic position or moves from the stereoscopic position to a crosstalk area, for example, it is possible to properly view a 3D image by following the movement of the viewer.

A head tracking stereoscopic display according to the present invention is characterized by comprising two one-eye systems each comprising a light emitting means comprising a first light source comprised of a set of two line-shaped light sources and a second light source comprised of the other set of two line-shaped light sources, a diffusing screen provided on the light emission side of the light emitting means, a first lenticular lens screen provided between the diffusing screen and the light emitting means for focusing light from the selected one of the line-shaped light sources and alternately forming bright portions and dark portions on the diffusing screen by semi-cylindrical lens portions constituting the first lenticular lens screen, a second lenticular lens screen provided on the light emission side of the diffusing screen and having the function of taking each of the bright portions formed on the diffusing screen as a light source for either one of the eyes, and an image display panel provided on the light emission side of the second lenticular lens screen, image supply means for fixedly displaying one of images and the other image which have binocular parallax, respectively, on the image display panel in one of the one-eye systems and the image display panel in the other one-eye system, head position detection means for detecting the position of the head of a viewer, and control means for suitably carrying out such control as to select light emission of the line-shaped light sources in each of the first and second light sources on the basis of information relating to the head position from the head position detection means.

In such construction, the light emitting means is constituted by the eight line-shaped light sources, the first lenticular lens screen, the diffusing screen, and the second lenticular lens screen, so that the construction can be made simpler and the cost can be made lower, as compared with a conventional light emitting means which is constituted by a combination of an imaging device and an image display device. Even when the viewer moves from a stereoscopic position to a pseudostereoscopic position or moves from the stereoscopic position to a crosstalk area, for example, it is possible to properly view a 3D image by following the movement of the viewer.

Although in such construction, two one-eye systems are required, an image displayed on each of the image display panels may be fixed, and the necessity of such control as to turn each of the line-shaped light sources on and off is eliminated.

A head tracking stereoscopic display according to the present invention is characterized by comprising two one-eye systems each comprising a light emitting means comprising a line-shaped light source for a first area and a line-shaped light source for a second area in a position shifted by approximately E/2 (E is the distance between the eyes of a viewer) in the horizontal direction from the first area, a diffusing screen provided on the light emission side of the light emitting means, a first lenticular lens screen provided between the diffusing screen and the light emitting means for focusing light from the selected one of the line-shaped light sources and alternately forming bright portions and dark portions on the diffusing screen by semicylindrical lens portions constituting the first lenticular lens screen, a second lenticular lens screen provided on the light emission side of the diffusing screen and having the function of taking each of the bright portions formed on the diffusing screen as a light source for either one of the eyes, and an image display panel provided on the light emission side of the second lenticular lens screen, image supply means for respectively displaying one of images and the other image which have binocular parallax on the image display panel in one of the one-eye systems and the image display panel in the other one-eye system so as to be switchable, head position detection means for detecting the position of the head of the viewer, and control means for suitably carrying out such control as to select light emission of the line-shaped light sources and switch the images displayed on the image display panels on the basis of information relating to the head position from the head position detection means.

In such construction, the light emitting means is constituted by the four line-shaped light sources, the first lenticular lens screen, the diffusing screen, and the second lenticular lens screen, so that the construction can be made simpler and the cost can be made lower, as compared with a conventional light emitting means which is constituted by a combination of an imaging device and an image display device. Even when the viewer moves from a stereoscopic position to a pseudostereoscopic position or moves from the stereoscopic position to a crosstalk area, it is possible to properly view a 3D image by following the movement of the viewer.

Although in such construction, two one-eye systems are required, and such control as to switch images displayed on the image display panel is required, the number of line-shaped light sources may be four, so that the cost can be made lower, as compared with the above-mentioned construction requiring the eight line-shaped light sources.

A head position detecting device according to the present invention is characterized by comprising light receiving means constructed by arranging a first light receiving device for a stereoscopic area and a second light receiving device for a pseudostereoscopic area in the horizontal direction, lens means for respectively introducing light reflected from the face of a viewer positioned in the stereoscopic area and light reflected from the face of the viewer positioned in the pseudostereoscopic area into the first light receiving device and the second light receiving device, and judgment means for comparing the amount of the light detected in the first light receiving device and the amount of the light detected in the second light receiving device, to judge which of the stereoscopic area and the pseudostereoscopic area is an area where the viewer is positioned.

In the above-mentioned construction, the head position detecting device is constituted by relatively low-cost components such as the light receiving means and the lens means, so that the cost of the head position detecting device can be lowered.

A head position detecting device according to the present invention is characterized by comprising light receiving means constructed by arranging a first light receiving device for a stereoscopic area, a second light receiving device for a pseudostereoscopic area, a third light receiving device for a first crosstalk area, and a fourth light receiving device for a second crosstalk area in the horizontal direction, lens means for respectively introducing light reflected from the face of a viewer positioned in the stereoscopic area, light reflected from the face of the viewer positioned in the pseudo stereoscopic area, light reflected from the face of the viewer positioned in the first crosstalk area, and light reflected from the face of the viewer positioned in the second crosstalk area into the first light receiving device, the second light receiving device, the third light receiving device, and the fourth light receiving device, and judgment means for comparing the amount of the light detected in the first light receiving device, the amount of the light detected in the second light receiving device, the amount of the light detected in the third light receiving device, and the amount of the light detected in the fourth light receiving device, to judge which of the stereoscopic area, the pseudo stereoscopic area, the first crosstalk area, and the second crosstalk area is an area where the viewer is positioned.

In the above-mentioned construction, it is possible to also detect that the head of the viewer is positioned in not only the stereoscopic area and the pseudostereoscopic area but also the first crosstalk area and the second crosstalk area. Also in such construction, the head position detecting device can be constituted by relatively low-cost components such as the light receiving device and the lens means, so that the cost of the head position detecting device can be lowered.

A plurality of lens means may be arranged in the horizontal direction. Letting n be an integer, E be the distance between the eyes of the viewer, and A be the horizontal distance from the center of a stereoscopic position right in front of a screen, when an area indicated by $(2n-\frac{1}{2}) \times E \leq A \leq (2n+\frac{1}{2}) \times E$ and an area indicated by $\{(2n+1)-\frac{1}{2}\} \times E < A < \{(2n+1)+\frac{1}{2}\} \times E$ on the basis of the center of the stereoscopic position right in front of the screen are respectively taken as a stereoscopic area and a pseudostereoscopic area, the stereoscopic area, the pseudostereoscopic area, the stereoscopic area, are formed in this order. This one cycle (this is referred to as one object area for convenience) is repeated for each distance which is twice the distance between the eyes. In this case, particularly when an area indicated by $\{(1+2n)/2-\frac{1}{4}\} \times E < A < \{(1+2n)/2+\frac{1}{4}\} \times E$ is taken as a crosstalk area, the stereoscopic area, the first crosstalk area, the pseudostereoscopic area, the second crosstalk area, the stereoscopic area, . . . are formed in this order. This one cycle (this is referred to as one object area for convenience) is repeated for each distance which is twice the distance between the eyes.

As described above, if a plurality of lens means are arranged in the horizontal direction, the object areas whose number corresponds to the number of lens means will be a range in which the head of the viewer can be detected. When a lenticular lens is used as the plurality of lens means thus arranged in the horizontal direction, the number of components can be made smaller and the assembly is made easier, as compared with a case where the lens means are separately constructed.

A head tracking stereoscopic display according to the present invention is characterized by comprising the above-mentioned head position detecting device, and being so constructed as to respectively introduce a right eye image and a left eye image to the right eye and the left eye of the viewer positioned in the stereoscopic area when a signal indicating that the viewer is positioned in the stereoscopic area is obtained in the head position detecting device, and so constructed as to respectively introduce the right eye image and the left eye image to the right eye and the left eye of the viewer positioned in the pseudostereoscopic area when a signal indicating that the viewer is positioned in the pseudostereoscopic area is obtained. Furthermore, the head tracking stereoscopic display is characterized by comprising the above-mentioned head position detecting device, and being so constructed as to respectively introduce a right eye image and a left eye image to the right eye and the left eye of the viewer positioned in the stereoscopic area when a signal indicating that the viewer is positioned in the stereoscopic area is obtained in the head position detecting device, so constructed as to respectively introduce the right eye image and the left eye image to the right eye and the left eye of the viewer positioned in the pseudostereoscopic area when a signal indicating that the viewer is positioned in the pseudostereoscopic area is obtained, so constructed as to respectively introduce the right eye image and the left eye image to the right eye and the left eye of the viewer positioned in the first crosstalk area when a signal indicating that the viewer is positioned in the first crosstalk area is obtained, and so constructed as to respectively introduce the right eye image and the left eye image to the right eye and the left eye of the viewer positioned in the second crosstalk area when a signal indicating that the viewer is positioned in the second crosstalk area is obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

An embodiment of the present invention will be described on the basis of the drawings.

Figure 1:
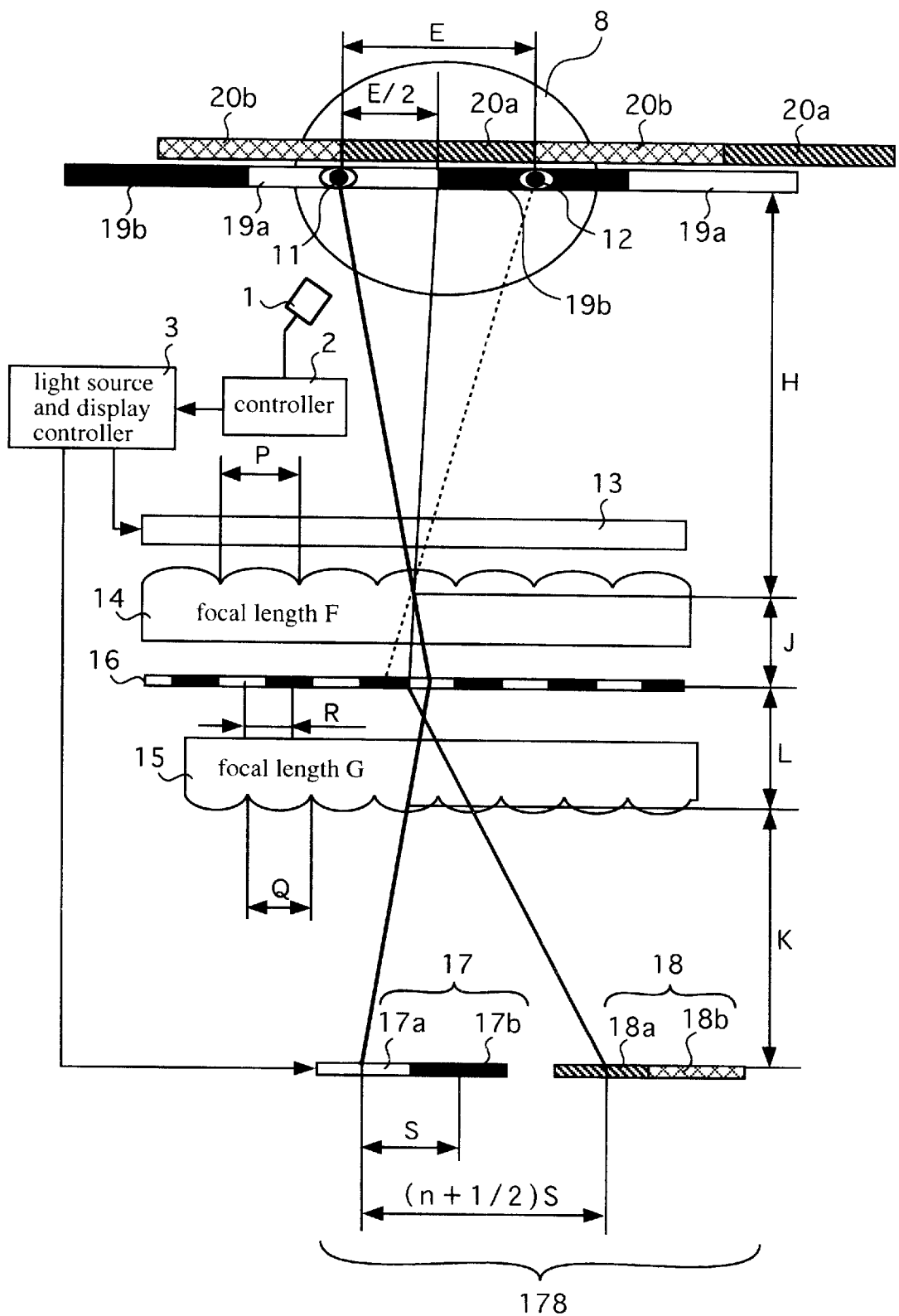
FIG. 1 is an explanatory view showing the schematic construction of a head tracking stereoscopic display according to a first embodiment of the present invention.

FIG. 1 is an explanatory view showing the schematic construction of a head tracking stereoscopic display according to the present embodiment. A light emitting unit 178 is constituted by a first combining light source 17 comprised of a set of two line-shaped light sources 17a and 17b for the right eye and the left eye, and a second combining light source 18 comprised of a set of two line-shaped light sources 18a and 18b for the right eye and the left eye. The first combining light source 17 is disposed for a stereoscopic area (it is also used in a pseudostereoscopic area), and the second combining light source 18 is disposed for a crosstalk area.

A first lenticular lens screen 15 constructed by arranging a lot of semi-cylindrical lens portions in the horizontal direction is disposed between the light emitting unit 178 and a diffusing screen 16 provided on the light emission side of the light emitting unit 178. The first lenticular lens screen 15 alternately converges light from the selected one of the combining light sources in a stripe shape on the diffusing screen 16 by the semi-cylindrical lens portions.

A second lenticular lens screen 14 constructed by arranging a lot of semi-cylindrical lens portions in the horizontal direction is disposed on the light emission side of the diffusing screen 16. The second lenticular lens screen 14 has the function of taking each of bright portions alternately formed in a stripe shape on the diffusing screen 16 as a light source for either one of the eyes.

An image display panel 13 composed of an LCD panel or the like is provided on the light emission side of the second lenticular lens screen 14. A right eye image and a left eye image are alternately displayed in time on the image display panel 13 by the controller 2 as described later.

Head position detection means 1 detects the position of the head of a viewer 8, and supplies its detection signal to the controller 2.

The controller 2 carries out such control as to change the timing at which images are alternately displayed for the light source display controller 3 and such control as to choose which of the first combining light source 17 and the second combining light source 18 should be driven on the basis of information relating to the head position from the head position detection means 1. The specific contents of the control will be described later.

The light source display controller 3 alternately turns one of the line-shaped light sources and another line-shaped light source in the selected one combining light source on and off, and alternately displays the right eye image and the left eye image on the image display panel 13 in synchronization with the alternate ON/OFF of the line-shaped light sources.

In FIG. 1, the viewer 8 is positioned in the center of a stereoscopic position right in front of a screen. Letting n be an integer, E be the distance between the eyes of the viewer 8, and A be the horizontal distance from the center of the stereoscopic position right in front of the screen, an area indicated by $(2n-\frac{1}{2}) \times E \leq A \leq (2n+\frac{1}{2}) \times E$ and an area indicated by $\{(2n+1)-\frac{1}{2}\} \times E < A < \{(2n+1)+\frac{1}{2}\} \times E$ on the basis of the center of the stereoscopic position right in front of the screen can be respectively taken as a stereoscopic area and a pseudostereoscopic area, and control paying attention to only the two areas can be also carried out. However, crosstalk occurs in the vicinity of the boundary between the stereoscopic area and the pseudostereoscopic area. Therefore, it is desired that the vicinity of the boundary is taken as a crosstalk area, and proper control corresponding to the crosstalk area is carried out. An area indicated by $\{(1+2n)/2-\frac{1}{4}\} \times E < A < \{(1+2n)/2+\frac{1}{4}\} \times E$ is taken as a crosstalk area. In this case, in areas—E/4 to E/4, E/4 to 3E/4, 3E/4 to 5E/4, 5E/4 to 7E/4, 7E/4 to 9E/4 formed on the basis of the center of the stereoscopic position right in front of the screen, stereoscopic, crosstalk, pseudostereoscopic, crosstalk, stereoscopic, are set in this order (see FIG. 10). Crosstalk from stereoscopic to pseudostereoscopic is defined as first crosstalk, and crosstalk from pseudostereoscopic to stereoscopic is defined as second crosstalk.

In FIG. 1, a combining light source which is being driven is indicted by a solid white pattern when it is turned on, while being indicated by a solid black pattern when it is turned off. A combining light source which is not being driven is indicated by hatching and crosshatching. Ranges in which images are recognized based on the line-shaped light sources 17a and 17b are respectively indicated by reference numbers 19a and 19b, and each of the ranges corresponds to the above-mentioned solid white or solid black pattern. Further, ranges in which images are recognized based on the line-shaped light sources 18a and 18b are respectively indicated by reference numbers 20a and 20b, and each of the ranges corresponds to the above-mentioned hatching or crosshatching.

Description is now made of the disposition relationship among the components, for example. Letting E be the distance between the eyes of the viewer 8, H be the distance between the viewer 8 and the second lenticular lens screen 14 (the center of the semi-cylindrical lens portion), J be the distance between the second lenticular lens screen 14 (the center of the semi-cylindrical lens portion) and the diffusing screen 16, L be the distance between the diffusing screen 16 and the first lenticular lens screen 15 (the center of the semi-cylindrical lens portion), and K be the distance between the first lenticular lens screen 15 (the center of the semi-cylindrical lens portion) and the light emitting unit 178, the pitch S between the line-shaped light sources 17a and 17b in the combining light source 17 and the pitch S between the line-shaped light sources 18a and 18b in the combining light source 18 satisfy S=K×E×J/(L×H).

Letting F be the focal length of each of the semi-cylindrical lens portions constituting the second lenticular lens screen 14, and G be the focal length of each of the semi-cylindrical lens portions in the first lenticular lens screen 15, F=J×H/(H−J) and G=L×K/(K−L) are satisfied. Letting P be the pitch between the semi-cylindrical lens portions constituting the second lenticular lens screen 14, and Q be the pitch between the semi-cylindrical lens portions constituting the first lenticular lens screen 15, P=2×E×J/(J+H) and Q=2×K×E×J/H×(L+K) are satisfied. Letting n be an integer, the pitch between the combining light sources satisfies (n+½)×S.

Operations in the head tracking stereoscopic display (the contents of the control by the controller 2) in cases where the viewer 8 is positioned in the stereoscopic area, the pseudostereoscopic area, and the crosstalk area will be described on the basis of FIGS. 2 to 10. The positional relationship among the stereoscopic area, the pseudostereoscopic area, and the crosstalk areas is illustrated in FIG. 10.

Figure 2:
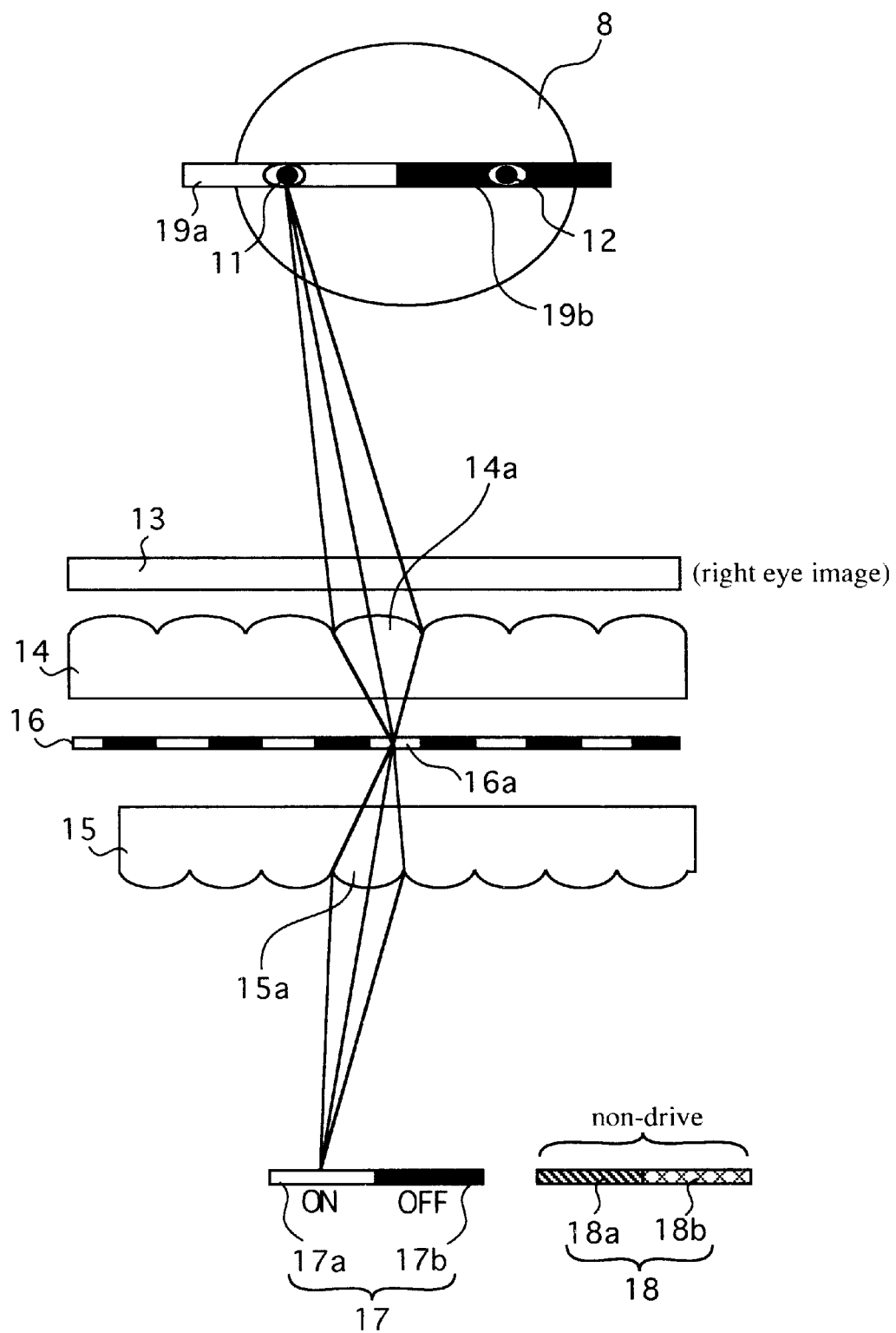
FIG. 2 is an explanatory view showing how light from a line-shaped light source is introduced into the right eye of a viewer positioned in a stereoscopic area in the construction shown in FIG. 1.

FIG. 2 illustrates a state where the viewer 8 is positioned in the stereoscopic area, the second combining light source 18 is not driven, only the line-shaped light source 17a in the first combining light source 17 is being turned on, a right eye image is displayed on the image display panel 13, and the right eye image is inputted to the right eye 11 of the viewer 8. More specifically, light from the line-shaped light source 17a is converged through a semi-cylindrical lens portion 15a, for example, in the first lenticular lens screen 15, to form a bright portion 16a on the diffusing screen 16. The bright portion 16a becomes a light emitting source, and light emitted therefrom is introduced into the right eye 11 of the viewer 8 by a semi-cylindrical lens portion 14a in the second lenticular lens screen 14.

Figure 3:
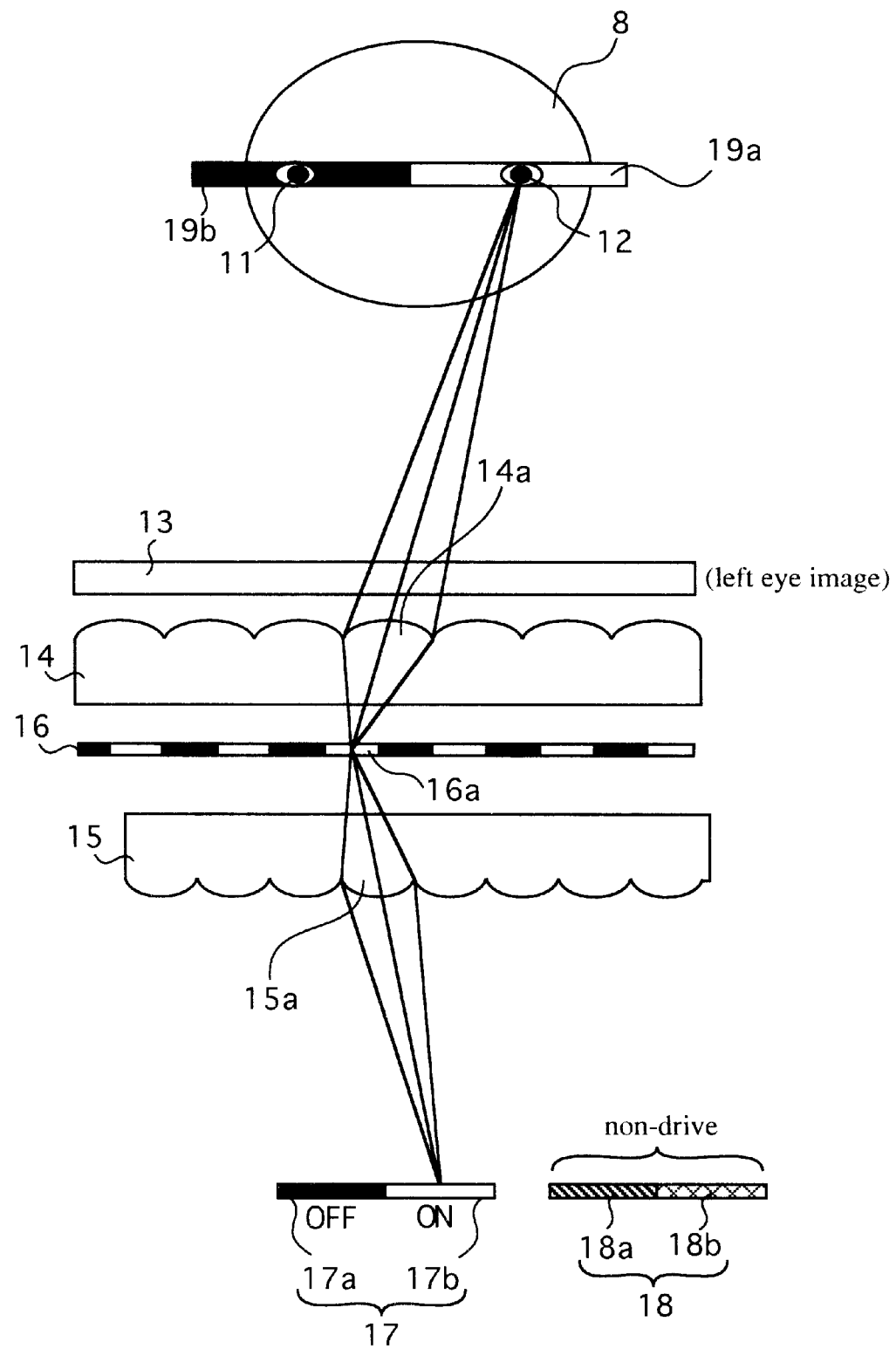
FIG. 3 is an explanatory view showing how light from a line-shaped light source is introduced into the left eye of a viewer positioned in a stereoscopic area in the construction shown in FIG. 1.

FIG. 3 illustrates a state where the viewer 8 is positioned in the stereoscopic area, the second combining light source 18 is not driven, only the line-shaped light source 17b in the first combining light source 17 is being turned on, a left eye image is displayed on the image display panel 13, and the left eye image is inputted to the left eye 12 of the viewer 8.

Figure 4:
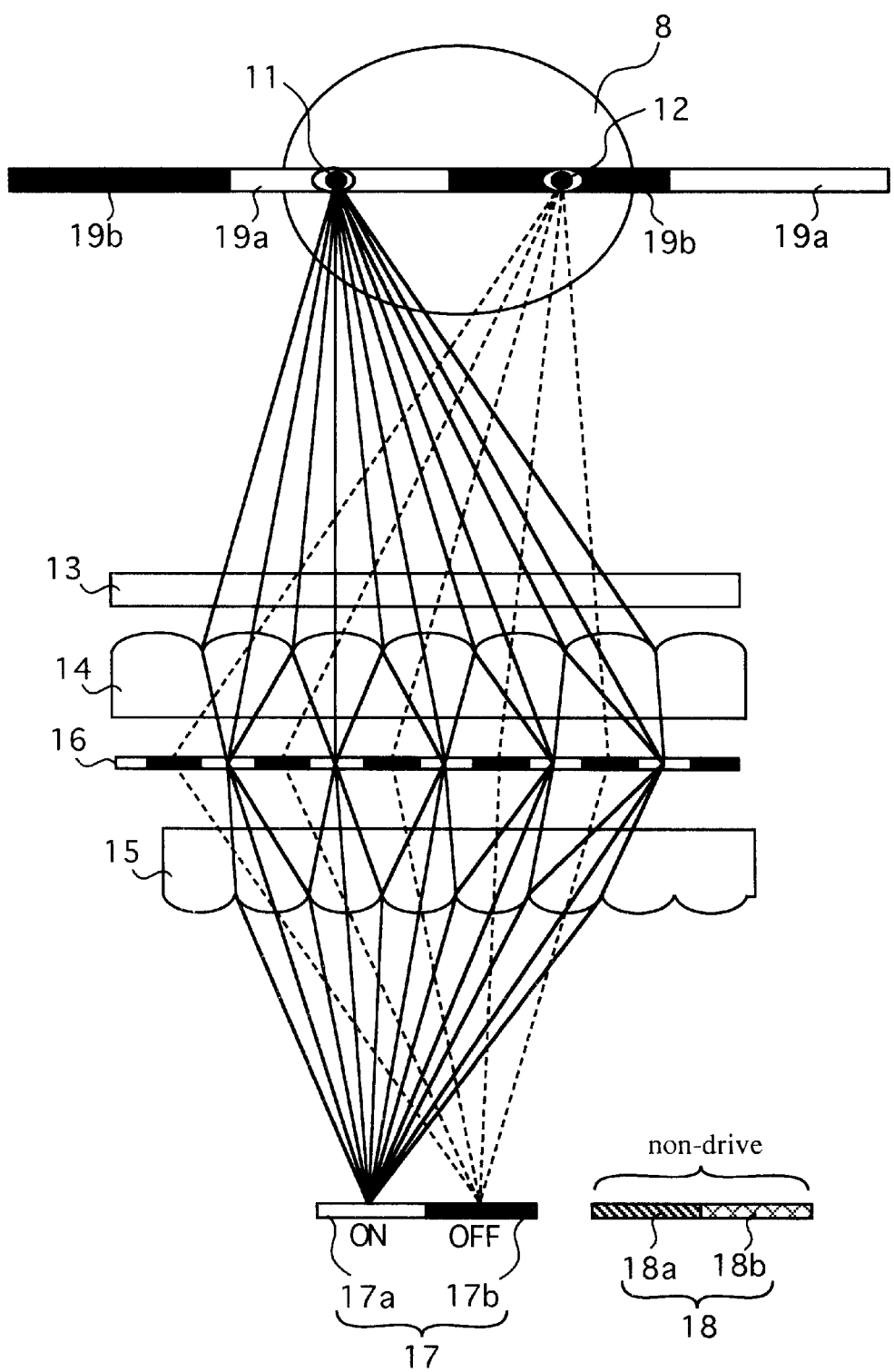
FIG. 4 is an explanatory view showing how light from line-shaped light sources are respectively introduced into the left eye and the right eye of a viewer positioned in a stereoscopic area in the construction shown in FIG. 1.

FIG. 4 is a diagram showing FIGS. 2 and 3 in synthesized fashion. The line-shaped light source 17a and the line-shaped light source 17b are alternately turned on, and a right eye image and a left eye image are alternately displayed on the image display panel 13 in synchronization with the alternate ON.

Figure 5:
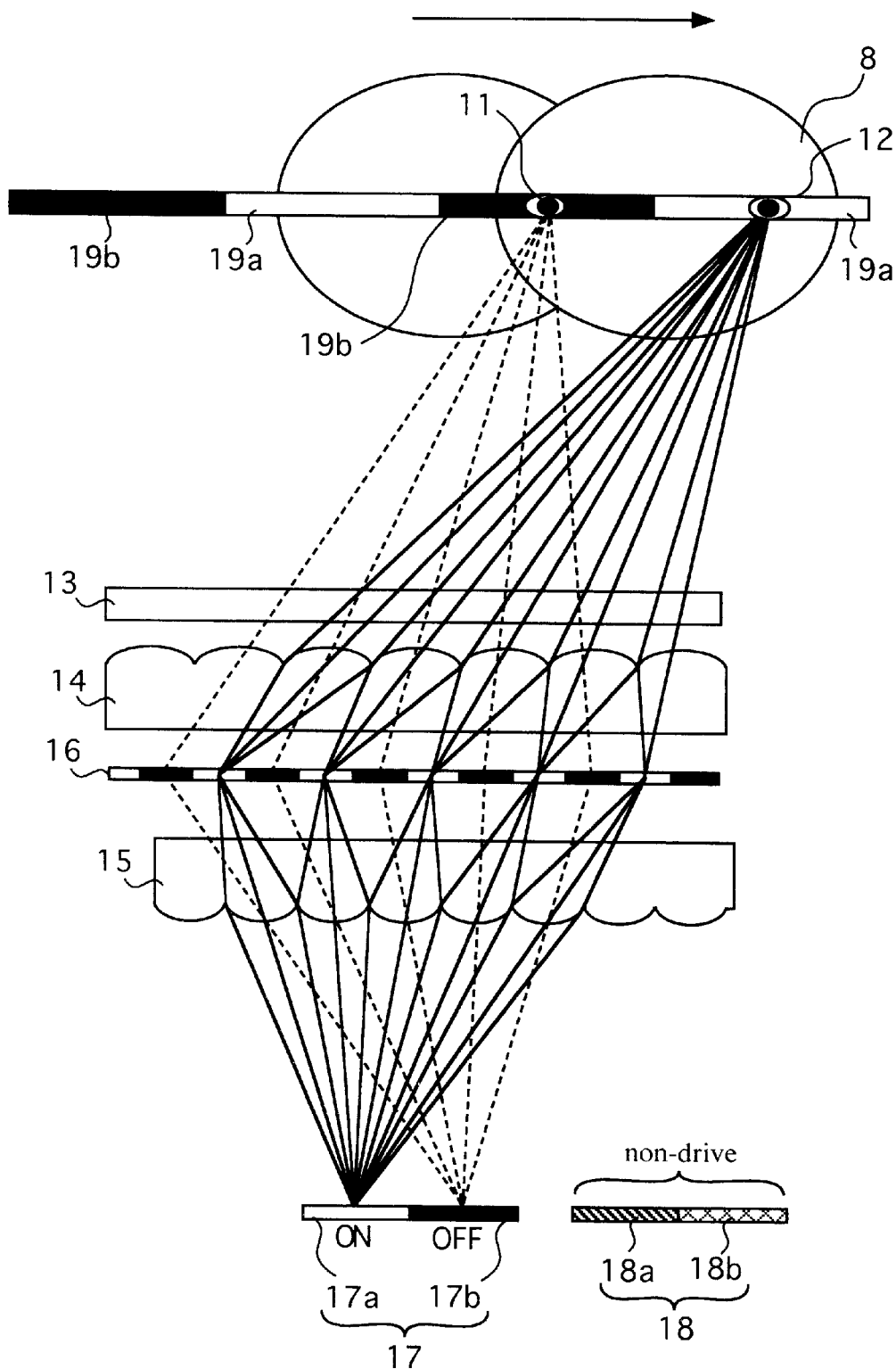
FIG. 5 is an explanatory view showing how light from line-shaped light sources are respectively introduced into the left eye and the right eye of a viewer positioned in a pseudostereoscopic area in the construction shown in FIG. 1.

FIG. 5 illustrates a state where the viewer 8 is positioned in the pseudostereoscopic area, the line-shaped light source 17a and the line-shaped light source 17b are alternately turned on, light from the line-shaped light source 17a is introduced into the left eye 12 of the viewer 8, and light from the line-shaped light source 17b is introduced into the right eye 11 of the viewer 8. Consequently, the timing at which a right eye image and a left eye image are alternately displayed on the image display panel 13 is reverse to that in the case of FIG. 4.

Figure 6:
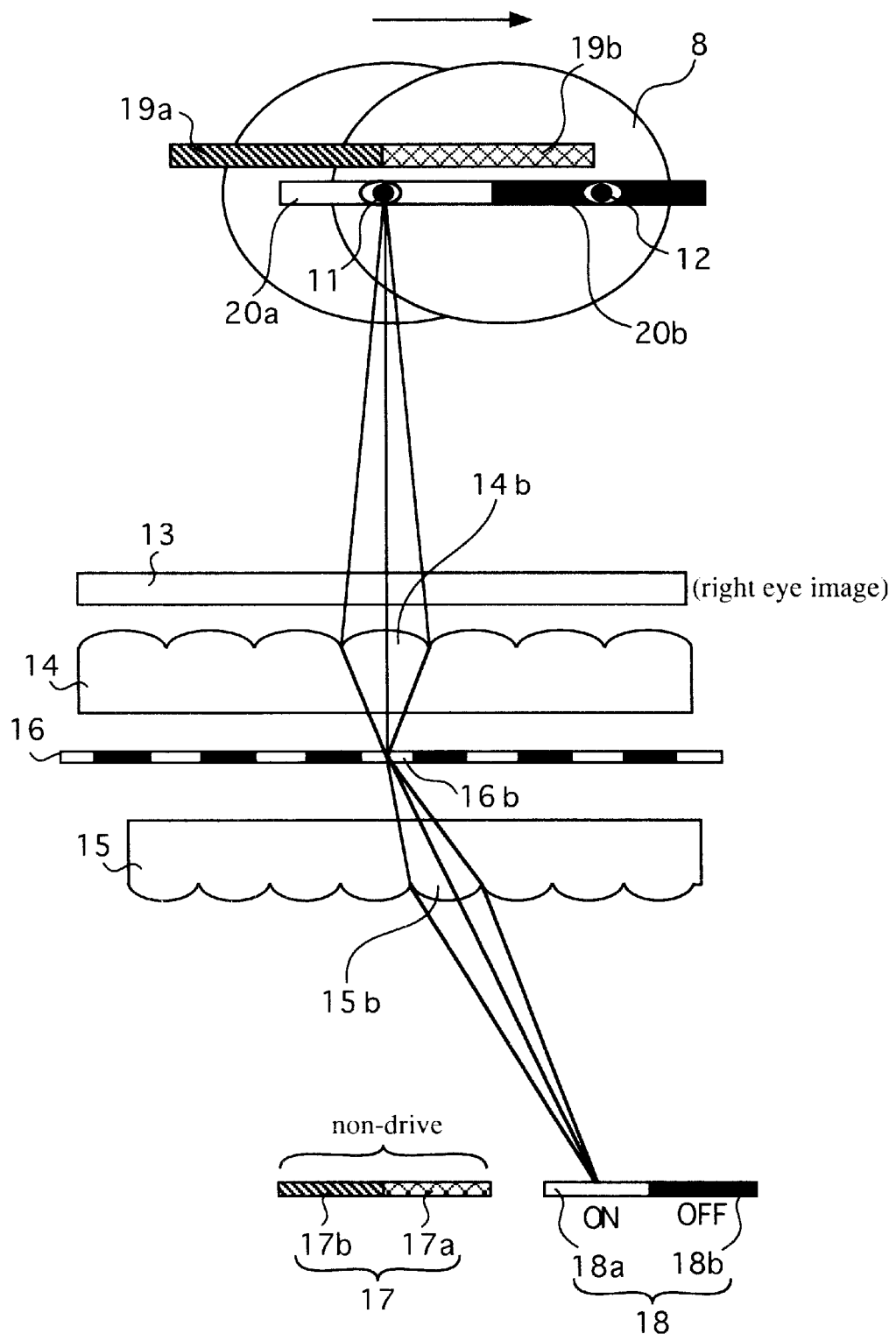
FIG. 6 is an explanatory view showing how light from a line-shaped light source is introduced into the right eye of a viewer positioned in a first crosstalk area in the construction shown in FIG. 1.

FIG. 6 illustrates a state where the viewer 8 is positioned in the first crosstalk area, the first combining light source 17 is not driven, only the line-shaped light source 18a in the second combining light source 18 is being turned on, a right eye image is displayed on the image display panel 13, and the right eye image is inputted to the right eye 11 of the viewer 8. More specifically, light from the line-shaped light source 18a is converged through a semi-cylindrical lens portion 15b in the first lenticular lens screen 15, for example, to form a bright portion 16b on the diffusing screen 16. The bright portion 16b becomes a light emitting source, and light emitted therefrom is introduced into the right eye 11 of the viewer 8 by a semi-cylindrical lens portion 14b in the second lenticular lens screen 14.

Figure 7:
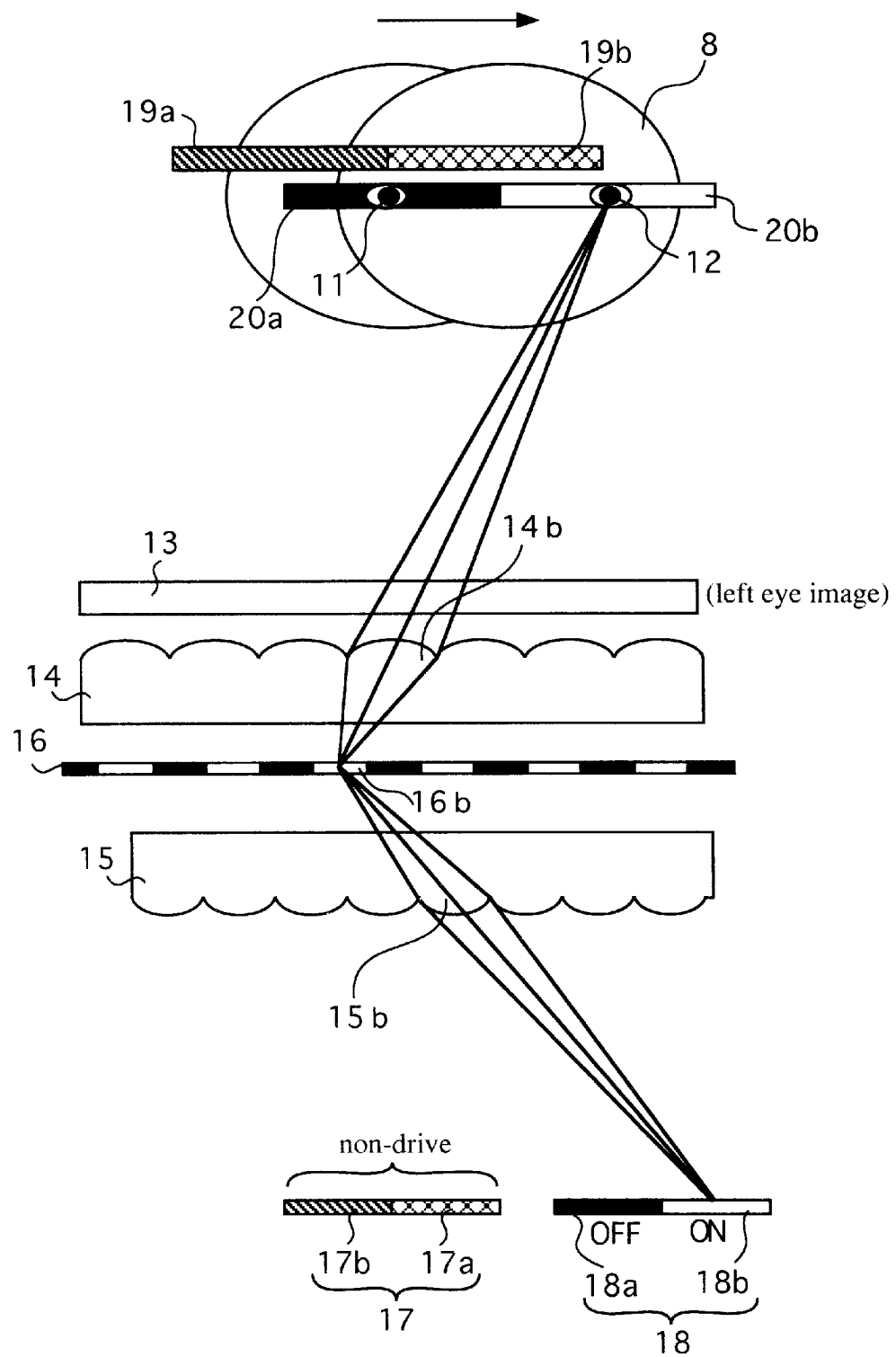
FIG. 7 is an explanatory view showing how light from a line-shaped light source is introduced into the left eye of a viewer positioned in a first crosstalk area in the construction shown in FIG. 1.

FIG. 7 illustrates a state where the viewer 8 is positioned in the first crosstalk area, the first combining light source 17 is not driven, only the line-shaped light source 18b in the second combining light source 18 is being turned on, a left eye image is displayed on the image display panel 13, and the left eye image is inputted to the left eye 12 of the viewer 8.

Figure 8:
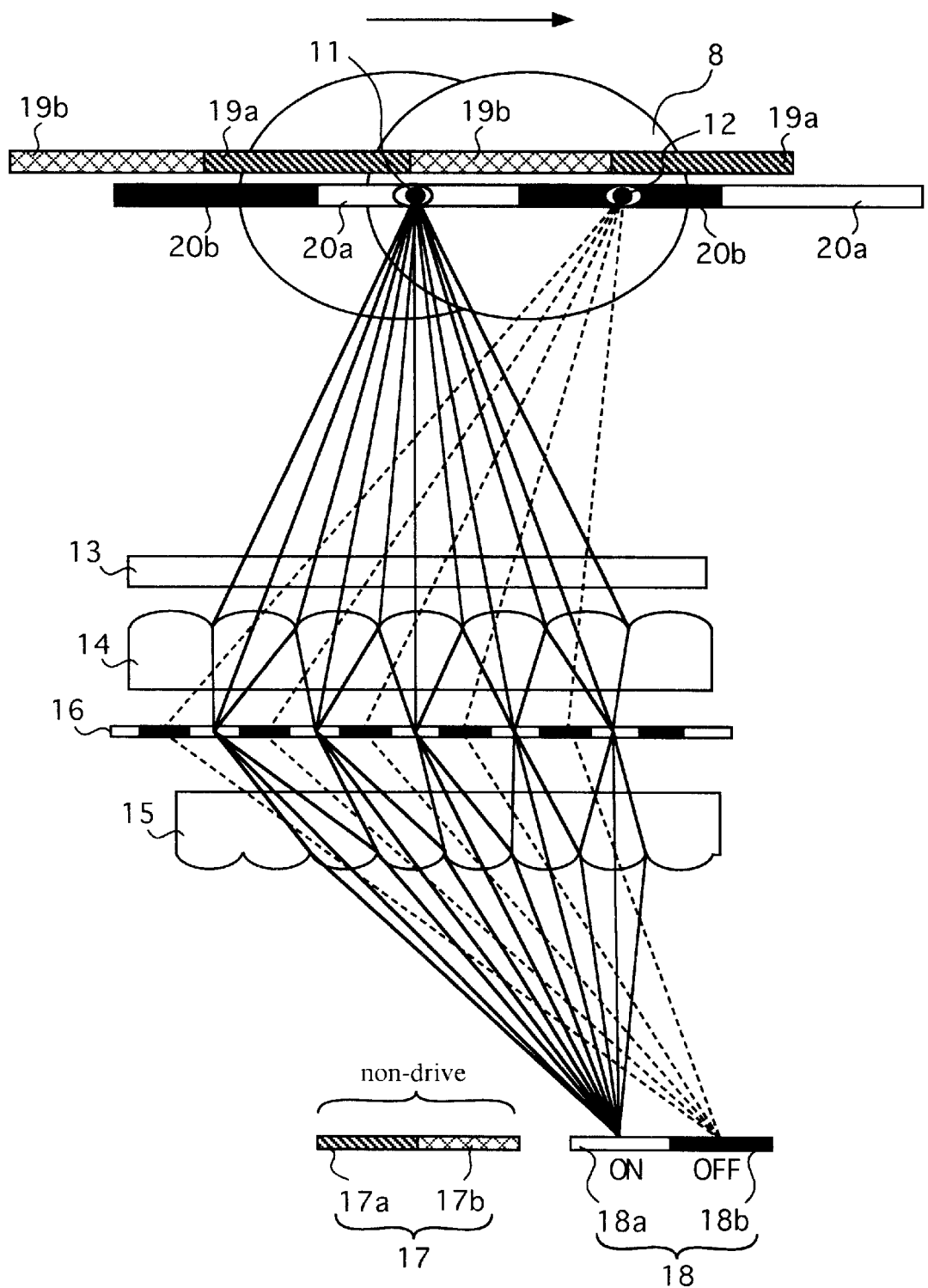
FIG. 8 is an explanatory view showing how light from line-shaped light sources are respectively introduced into the right eye and the left eye of a viewer positioned in a first crosstalk area in the construction shown in FIG. 1.

FIG. 8 is a diagram showing FIGS. 6 and 7 in synthesized fashion. The line-shaped light source 18a and the line-shaped light source 18b are alternately turned on, and a right eye image and a left eye image are alternately displayed on the image display panel 13 in synchronization with the alternate ON.

Figure 9:
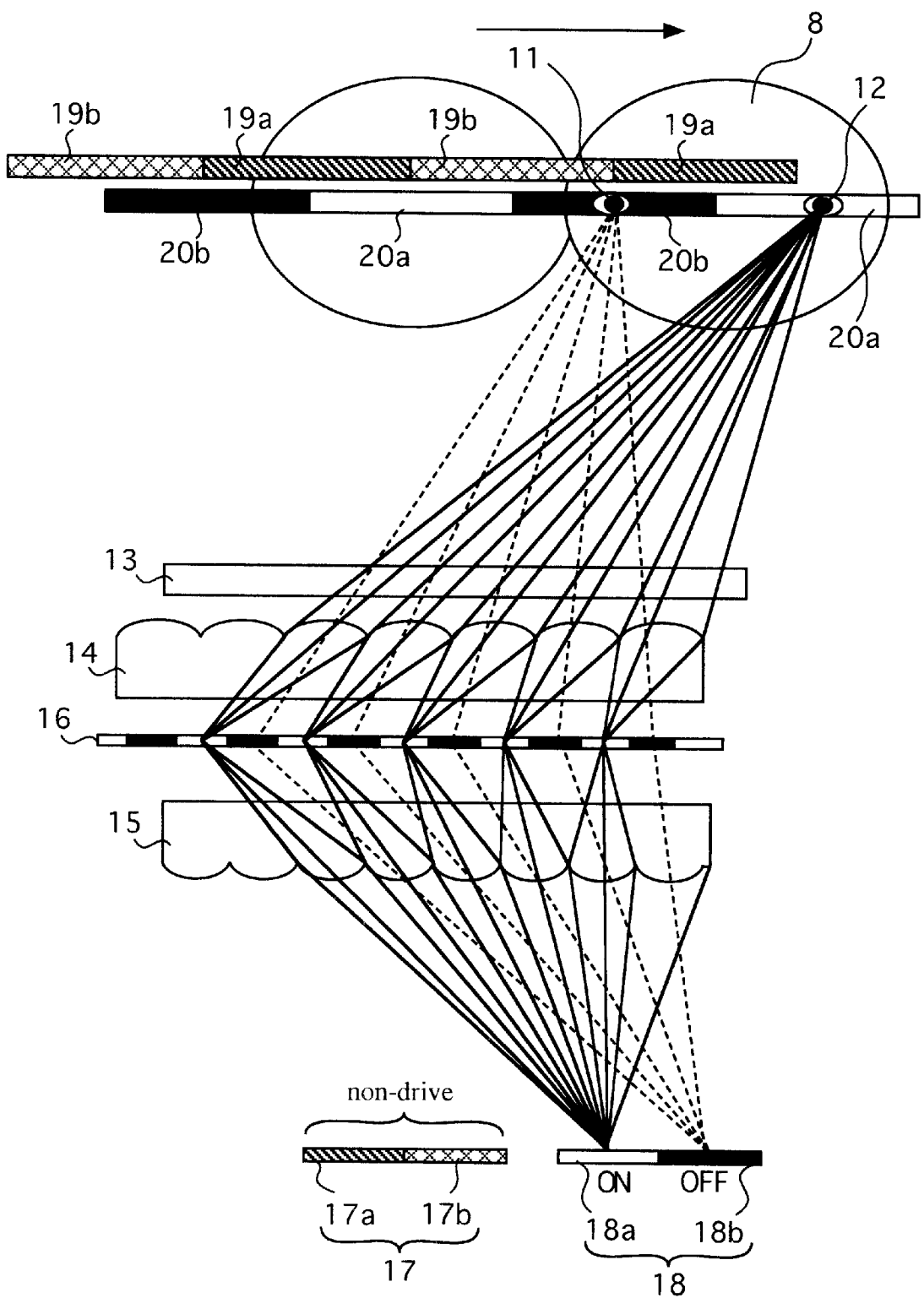
FIG. 9 is an explanatory view showing how light from line-shaped light sources are respectively introduced into the right eye and the left eye of a viewer positioned in a second crosstalk area in the construction shown in FIG. 1.
Figure 10:
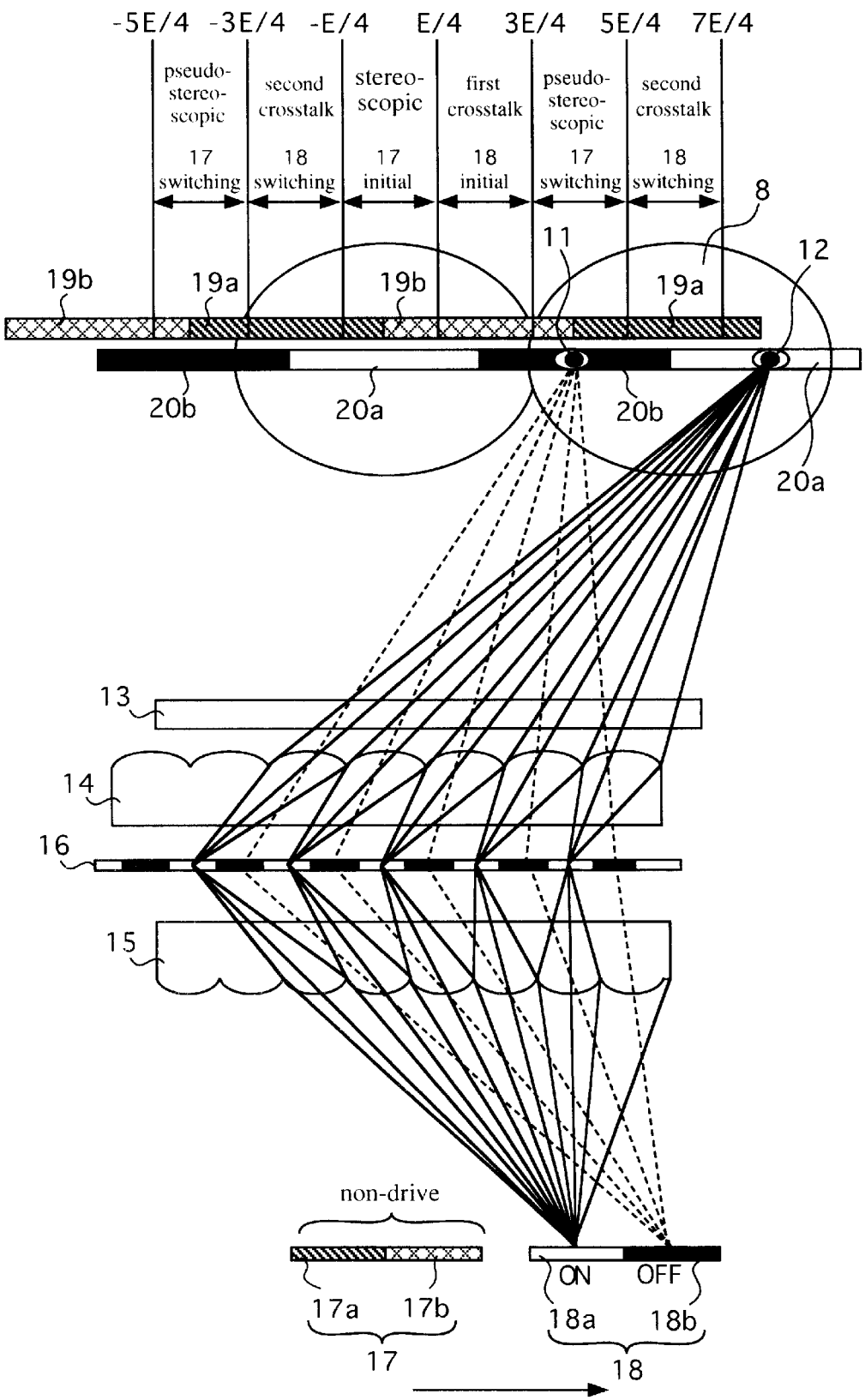
FIG. 10 is an explanatory view showing the positional relationship among a stereoscopic area, a pseudostereoscopic area, a first crosstalk area, and a second crosstalk area in the construction shown in FIG. 1.

FIG. 9 illustrates a state where the viewer 8 is positioned in the second crosstalk area. The line-shaped light source 18a and the line-shaped light source 18b are alternately turned on, and a right eye image and a left eye image are alternately displayed on the image display panel 13 in synchronization with the alternate ON. The timing of the alternate display is reverse to that in the cases of FIGS. 6 to 8.

FIG. 10 illustrates a state where the center of the head of the viewer 8 is positioned in the second crosstalk area, and shows how the stereoscopic area, the first crosstalk area, the pseudostereoscopic area, and the second crosstalk area are formed in this order. "17", and "18" attached to corresponding positions in the respective areas correspond to reference numbers attached to the respective combining light sources, and "initial" and "switching" indicate that the timings of image switching are reverse to each other.

As described in the foregoing, according to the head tracking stereoscopic display according to the present embodiment, the light emitting unit is constituted by the four line-shaped light sources 17a, 17b, 18a, and 18b, the first lenticular lens screen 15, the diffusing screen 16, and the second lenticular lens screen 14, so that the construction can be made simpler and the cost can be made lower, as compared with the conventional light emitting unit which is constituted by a combination of an imaging device and an image display device. Even when the viewer moves from the stereoscopic position to the pseudostereoscopic position or moves from the stereoscopic position to the first or second crosstalk area, it is possible to properly view a 3D image by following the movement of the viewer.

Embodiment 2

A second embodiment of the present invention will be described on the basis of the drawings.

Figure 11:
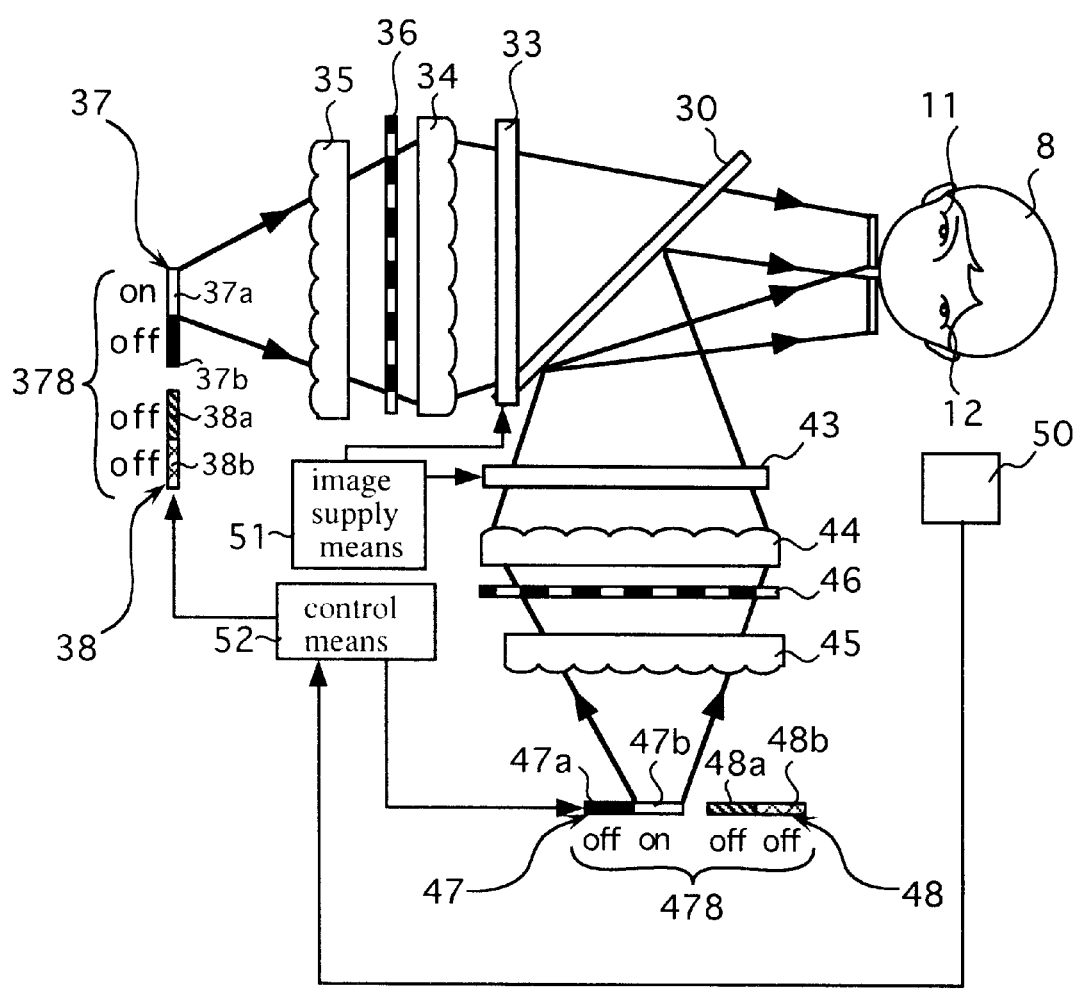
FIG. 11 is an explanatory view showing the schematic construction of a head tracking stereoscopic display according to a second embodiment of the present invention.

FIG. 11 is an explanatory view showing the schematic construction of a head tracking stereoscopic display comprising two one-eye systems according to the present embodiment. In each of the one-eye systems, a light emitting unit 378 (478) is constituted by a first combining light source 37 (47) comprised of a set of two line-shaped light sources 37a and 37b (47a and 47b) for a stereoscopic area and a pseudostereoscopic area, and a second combining light source 38 (48) comprised of a set of two line-shaped light sources 38a and 38b (48a and 48b) for first and second crosstalk areas.

A first lenticular lens screen 35 (45) constructed by arranging a lot of semi-cylindrical lens portions in the horizontal direction is disposed between the light emitting unit 378 (478) and a diffusing screen 36 (46) provided on the light emission side of the light emitting unit 378 (478). The first lenticular lens screen 35 (45) alternately converges light from the selected one of the combining light sources in a stripe shape on the diffusing screen 36 (46) by the semi-cylindrical lens portions.

A second lenticular lens screen 34 (44) constructed by arranging a lot of semi-cylindrical lens portions in the horizontal direction is disposed on the light emission side of the diffusing screen 36 (46). The second lenticular lens screen 34 (44) has the function of taking each of bright portions on the diffusing screen 36 (46) as a light source for either one of the eyes.

An image display panel 33 (43) composed of an LCD panel or the like is provided on the light emission side of the second lenticular lens screen 34 (44). A right eye image and a left eye image are fixedly supplied, respectively, to the image display panel 33 and the image display panel 43 by image supply means 51 as described later.

A half mirror 30 passes the right eye image from the image display panel 33 and introduces the image into the viewer 8, while reflecting the left eye image from the image display panel 43 and introducing the image into the viewer 8.

Head position detection means 50 detects the position of the head of the viewer 8, and supplies its detection signal to controller means 52.

The controller 52 carries out such control as to choose which of the first combining light source 37 (47) and the second combining light source 38 (48) should be driven on the basis of information relating to the head position from head position detection means 50. The specific contents of the control will be described later.

FIGS. 12 to 16 correspond to the one-eye system for displaying the right eye image. The one-eye system for displaying the left eye image is omitted because it is basically the same in the construction and the function as the one-eye system for displaying the right eye image except for images to be displayed.

Figure 12:
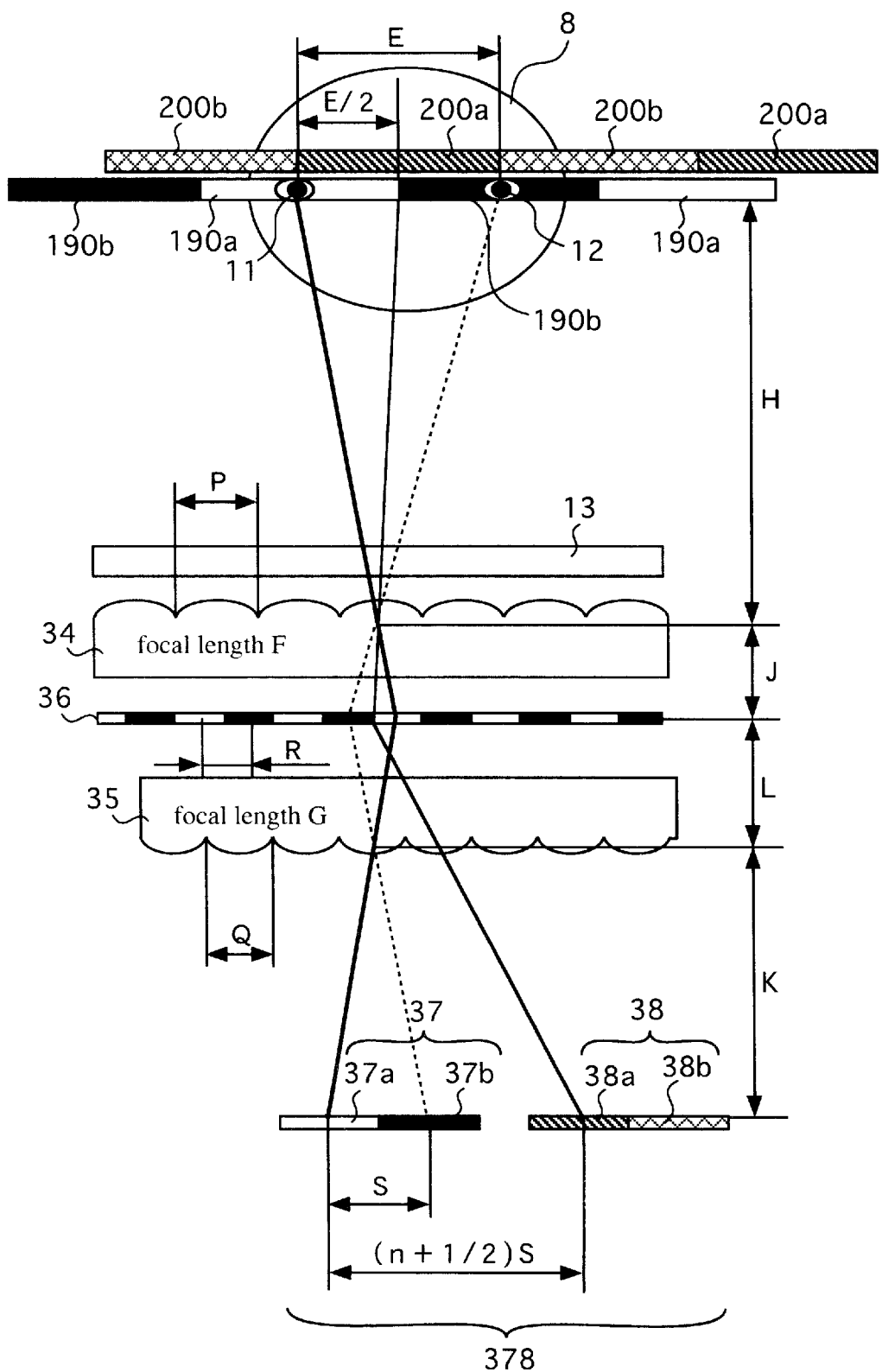
FIG. 12 is an explanatory view showing the disposition relationship among components in one one-eye system in the construction shown in FIG. 11.

In FIG. 12, the viewer 8 is positioned in the center of a stereoscopic position right in front of a screen. Letting n be an integer, E be the distance between the eyes of the viewer 8, and A be the horizontal distance from the center of the stereoscopic position right in front of the screen, an area indicated by $(2n-\frac{1}{2})\times E \leq A \leq (2n+\frac{1}{2})\times E$ and an area indicated by $\{(2n+1)-\frac{1}{2}\}\times E < A < \{(2n+1)+\frac{1}{2}\}\times E$ on the basis of the center of the stereoscopic position right in front of the screen can be respectively taken as a stereoscopic area and a pseudostereoscopic area, and control paying attention to only the two areas can be also carried out.

However, crosstalk occurs in the vicinity of the boundary between the stereoscopic area and the pseudostereoscopic area. Therefore, it is desired that the vicinity of the boundary is taken as a crosstalk area, and proper control corresponding to the crosstalk area is carried out. An area indicated by $\{(1+2n)/2-\frac{1}{4}\}\times E < A < \{(1+2n)/2+\frac{1}{4}\}\times E$ is taken as a crosstalk area. In this case, in areas—E/4 to E/4, E/4 to 3E/4, 3E/4 to 5E/4, 5E/4 to 7E/4, 7E/4 to 9E/4 . . . formed on the basis of the center of the stereoscopic position right in front of the screen, stereoscopic, crosstalk, pseudostereoscopic, crosstalk, stereoscopic, are set in this order (see FIGS. 15 and 16). Crosstalk from stereoscopic to pseudostereoscopic is defined as first crosstalk, and crosstalk from pseudostereoscopic to stereoscopic is defined as second crosstalk.

In FIG. 12, a combining light source which is being driven is indicated by a solid white pattern when it is turned on, while being indicated by a solid black pattern when it is turned off. A combining light source which is not being driven is indicated by hatching and crosshatching. Ranges in which images are recognized based on the line-shaped light sources 37a and 37b are respectively indicated by reference numbers 190a and 190b, and each of the ranges corresponds to the above-mentioned solid white or solid black pattern. Further, ranges in which images are recognized based on the line-shaped light sources 38a and 38b are respectively indicated by reference numbers 200a and 200b, and each of the ranges corresponds to the above-mentioned hatching or crosshatching.

Description is now made of the disposition relationship among the components, for example. Letting E be the distance between the eyes of the viewer 8, H be the distance between the viewer 8 and the second lenticular lens screen 34 (the center of the semi-cylindrical lens portion), J be the distance between the second lenticular lens screen 34(the center of the semi-cylindrical lens portion) and the diffusing screen 36, L be the distance between the diffusing screen 36 and the first lenticular lens screen 35 (the center of the semi-cylindrical lens portion), and K be the distance between the first lenticular lens screen 35 (the center of the semi-cylindrical lens portion) and the light emitting unit 378, the pitch S between the line-shaped light sources 37a and 37b in the combining light source 37 and the pitch S between the line-shaped light sources 38a and 38b in the combining light source 38 satisfy $S=K\times E\times J/(L\times H)$.

Letting F be the focal length of each of the semi-cylindrical lens portions constituting the second lenticular lens screen 34, and G be the focal length of each of the semi-cylindrical lens portions constituting the first lenticular lens screen 35, $F=J\times H/(H-J)$ and $G=L\times K/(K-L)$ are satisfied. Letting P be the pitch between the semi-cylindrical lens portions constituting the second lenticular lens screen 34, and Q be the pitch between the semi-cylindrical lens portions constituting the first lenticular lens screen 35, $P=2\times E\times J/(J+H)$ and $Q=2\times K\times E\times J/(H\times(L+K))$ are satisfied. Letting n be an integer, the pitch between the combining light sources satisfies $(n+\frac{1}{2})\times S$.

Operations in the head tracking stereoscopic display (the contents of the control by the controller 52) in cases where the viewer 8 is positioned in the stereoscopic area, the pseudostereoscopic area, and the crosstalk areas will be described on the basis of FIGS. 13 to 16. The positional relationship among the stereoscopic area, the pseudostereoscopic area, and the crosstalk areas is illustrated in FIGS. 15 and 16.

Figure 13:
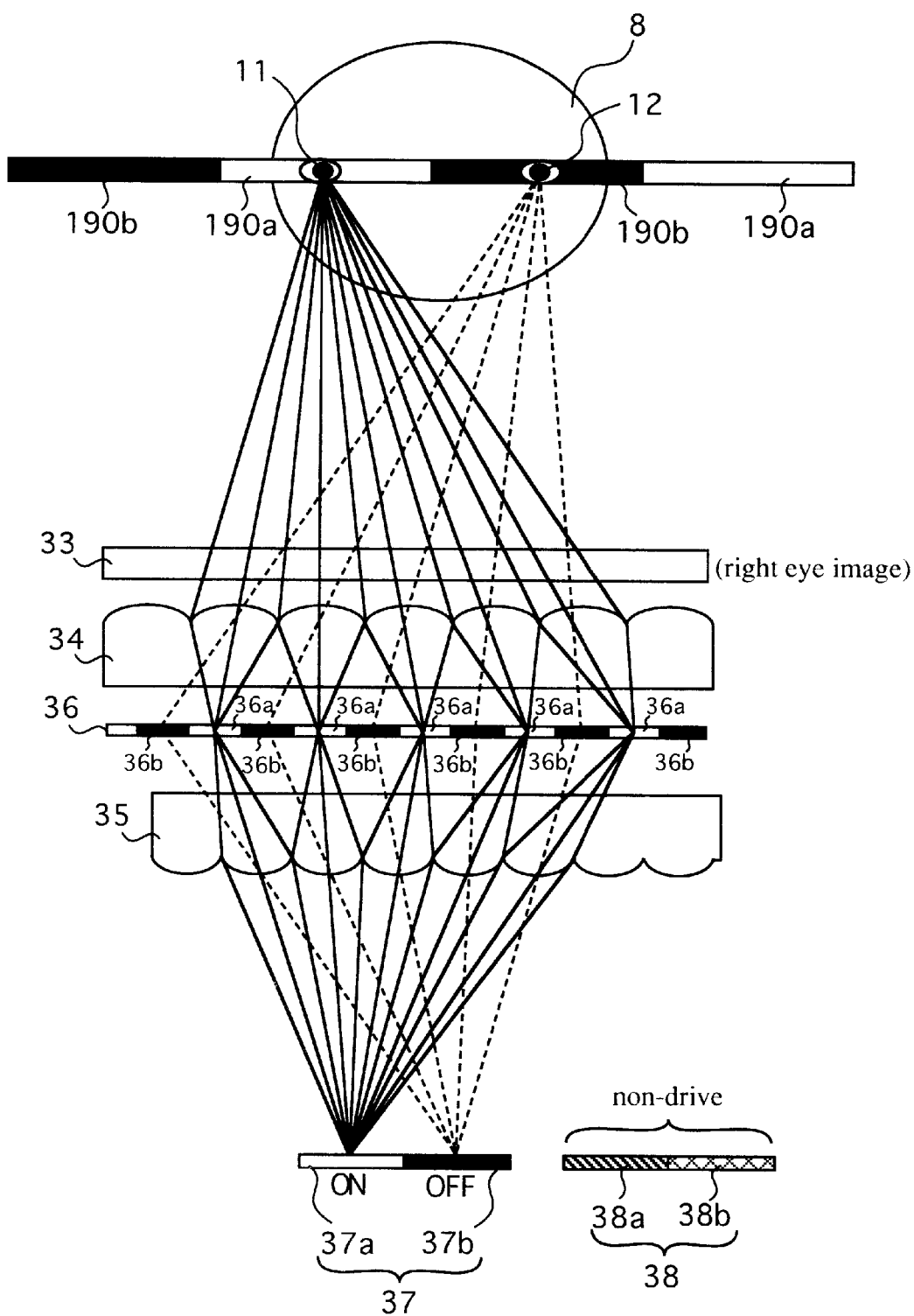
FIG. 13 is an explanatory view showing how light from line-shaped light sources are respectively introduced into the right eye and the left eye of a viewer positioned in a stereoscopic area in the construction shown in FIG. 11.

FIG. 13 illustrates a state where the viewer 8 is positioned in the stereoscopic area, the second combining light source 38 is not driven, only the line-shaped light source 37a in the first combining light source 37 is being turned on, a right eye image is fixedly displayed on the image display panel 33, and the right eye image is inputted to the right eye 11 of the viewer 8. More specifically, light from the line-shaped light source 37a is converged through the semi-cylindrical lens portions constituting the first lenticular lens screen 35, so that bright portions 36a and dark portions 36b are alternately formed on the diffusing screen 36. The bright portion 36a becomes a light emitting source, and light emitted therefrom is introduced into the right eye 11 of the viewer 8 by the semi-cylindrical lens portion in the second lenticular lens screen 34.

Figure 14:
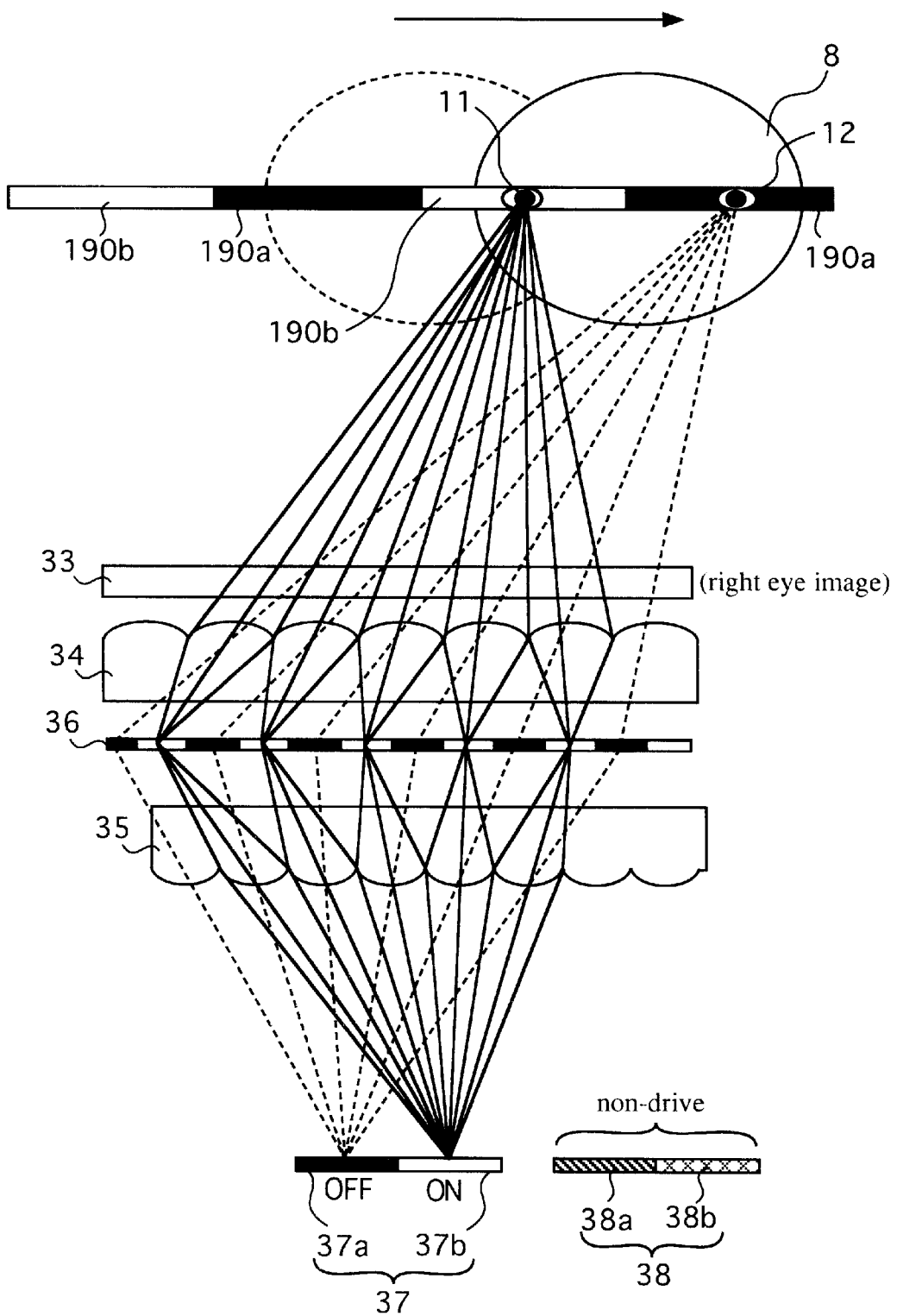
FIG. 14 is an explanatory view showing how light from line-shaped light sources are respectively introduced into the right eye and the left eye of a viewer positioned in a pseudostereoscopic area in the construction shown in FIG. 11.

FIG. 14 illustrates a state where the viewer 8 is positioned in the pseudostereoscopic area, only the line-shaped light source 37b in the first combining light source 37 is being turned on, and light from the line-shaped light source 37b is introduced into the right eye 11 of the viewer 8. That is, although ON and OFF of the light source are switched, the right eye image may be fixedly displayed as it is on the image display panel 33.

Figure 15:
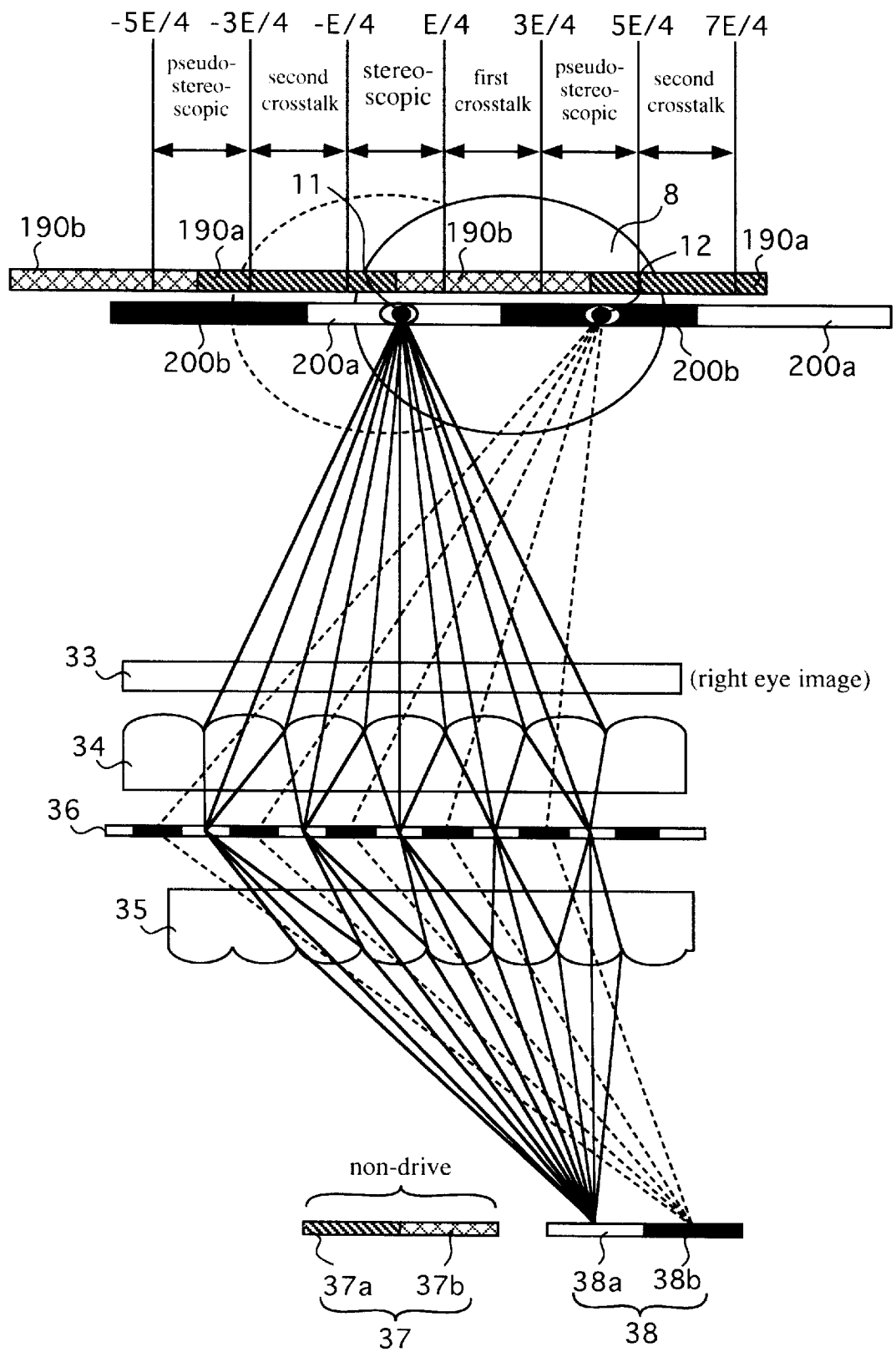
FIG. 15 is an explanatory view showing how light from line-shaped light sources are respectively introduced into the right eye and the left eye of a viewer positioned in a first crosstalk area in the construction shown in FIG. 11.
Figure 16:
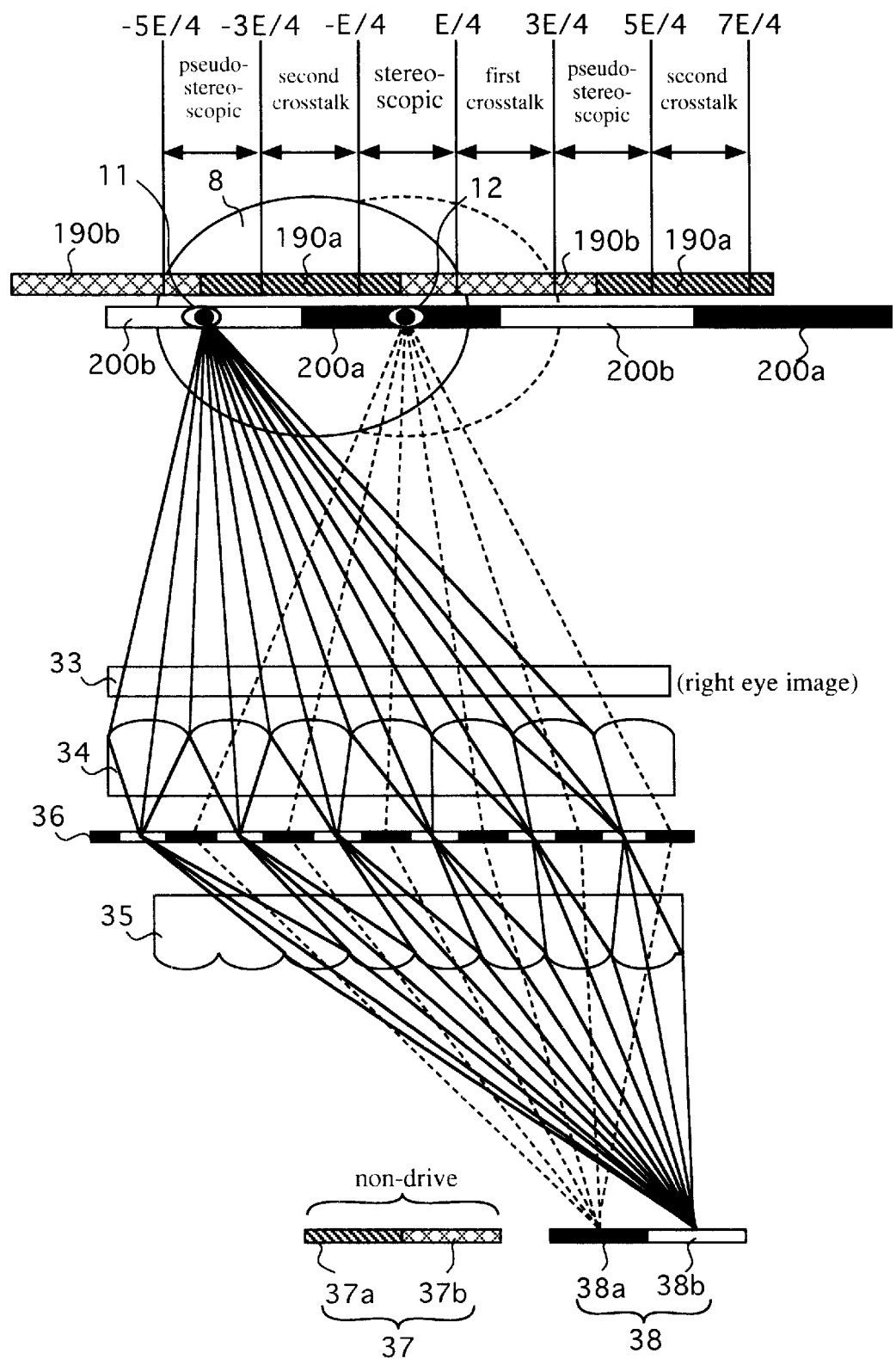
FIG. 16 is an explanatory view showing how light from line-shaped light sources are respectively introduced into the right eye and the left eye of a viewer positioned in a second crosstalk area in the construction shown in FIG. 11.

FIG. 15 illustrates a state where the viewer 8 is positioned in the first crosstalk area, the first combining light source 37 is not driven, only the line-shaped light source 38a in the second combining light source 38 is being turned on, a right eye image is fixedly displayed on the image display panel 33, and the right eye image is inputted to the right eye 11 of the viewer 8.

FIG. 16 illustrates a state where the viewer 8 is positioned in the second crosstalk area, the first combining light source 37 is not driven, only the line-shaped light source 38b in the second combining light source 38 is being turned on, a right eye image is fixedly displayed on the image display panel 33, and the right eye image is inputted to the right eye 11 of the viewer 8.

In the above-mentioned construction, the light emitting units are constituted by the eight line-shaped light sources 37a, 37b, 38a, 38b, 47a, 47b, 48a, and 48b, the first lenticular lens screens 35 and 45, the diffusing screens 36 and 46, and the second lenticular lens screens 24 and 44, so that the construction can be made simpler and the cost can be made lower, as compared with the conventional light emitting unit which is constituted by a combination of an imaging device and an image display device. Even when the viewer 8 moves from the stereoscopic position to the pseudostereoscopic position or moves from the stereoscopic position to the crosstalk area, it is also possible to properly view a 3D image by following the movement of the viewer.

Although in comparison with the first embodiment, two one-eye systems are required, and the half mirror 30 is required, an image displayed on each of the image display panels 33 and 43 may be fixed, and the necessity of such control as to turn each of the line-shaped light sources on and off in response to the timing of switching between the right and left eye images is eliminated.

Embodiment 3

A third embodiment of the present invention will be described on the basis of the drawings.

Figure 17:
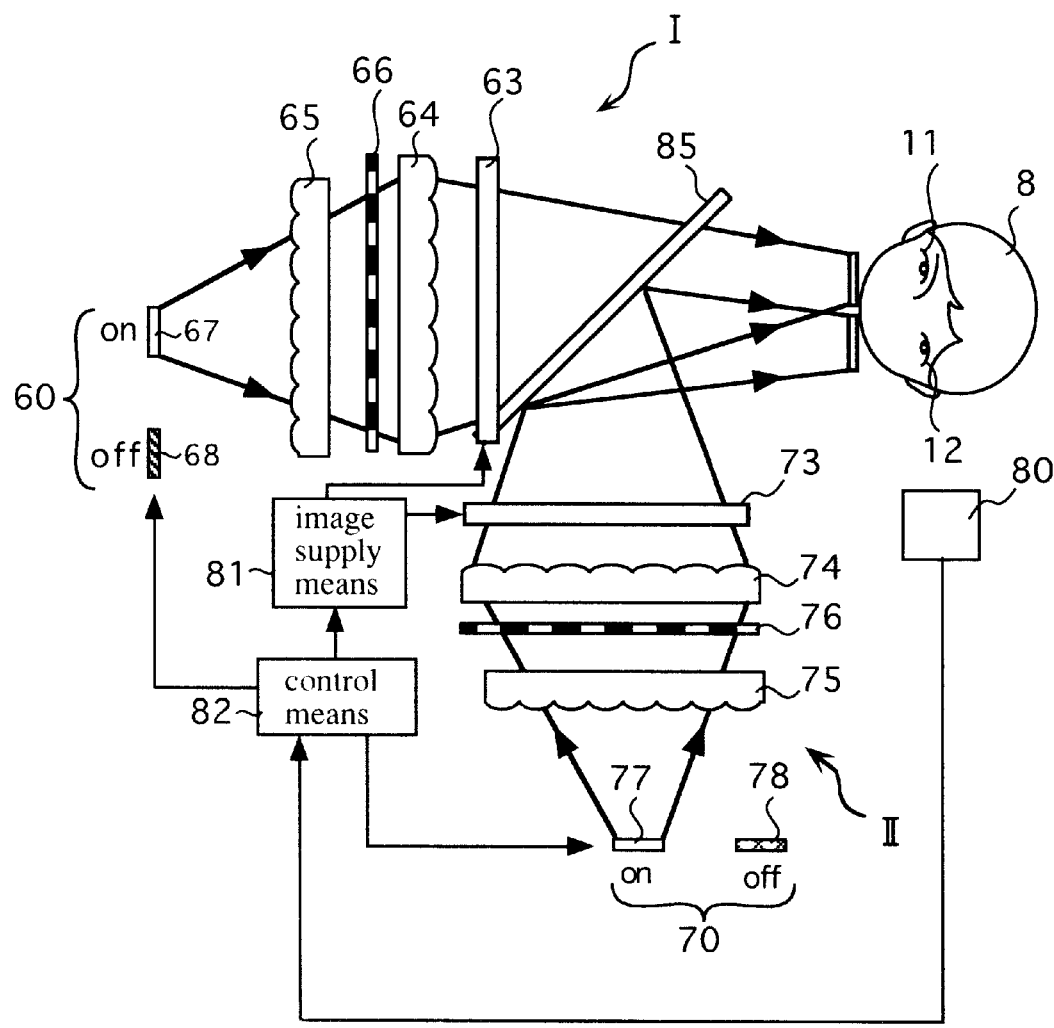
FIG. 17 is an explanatory view showing the schematic construction of a head tracking stereoscopic display according to a third embodiment of the present invention.

FIG. 17 is an explanatory view showing the schematic construction of a head tracking stereoscopic display comprising two one-eye systems I and II according to the present embodiment. In each of the one-eye systems I and II, a light emitting unit 60 (70) comprises two line-shaped light sources 67 and 68 (77 and 78) for a stereoscopic area and a crosstalk area.

A first lenticular lens screen 65 (75) constructed by arranging a lot of semi-cylindrical lens portions in the horizontal direction is disposed between the light emitting unit 60 (70) and a diffusing screen 66 (76) provided on the light emission side of the light emitting unit 60 (70). The first lenticular lens screen 65 (75) alternately converges light from the selected one of the line-shaped light sources in a stripe shape on the diffusing screen 66 (76) by the semi-cylindrical lens portions.

A second lenticular lens screen 64 (74) constructed by arranging a lot of semi-cylindrical lens portions in the horizontal direction is disposed on the light emission side of the diffusing screen 66 (76). The second lenticular lens screen 64 (74) has the function of taking each of bright portions alternately formed on the diffusing screen 66 (76) as a light source for either one of the eyes.

An image display panel 63 (73) composed of an LCD panel or the like is provided on the light emission side of the second lenticular lens screen 64 (74). A right or left eye image and a left or right eye image are supplied, respectively, to the image display panel 63 and the image display panel 73 so as to be switchable by image supply means 81 as described later.

A half mirror 85 passes the right eye image from the image display panel 63 and introduces the image into the viewer 8, while reflecting the left eye image from the image display panel 73 and introducing the image into the viewer 8.

Head position detection means 80 detects the position of the head of the viewer 8, and supplies its detection signal to control means 82.

The control means 82 carries out such control as to select light emission of the line-shaped light sources 67 and 68 (77 and 78) and switch images displayed on the image display panels 63 and 73 on the basis of information relating to the head position from head position detection means 80. The detailed contents of the control will be described later.

Figure 18:
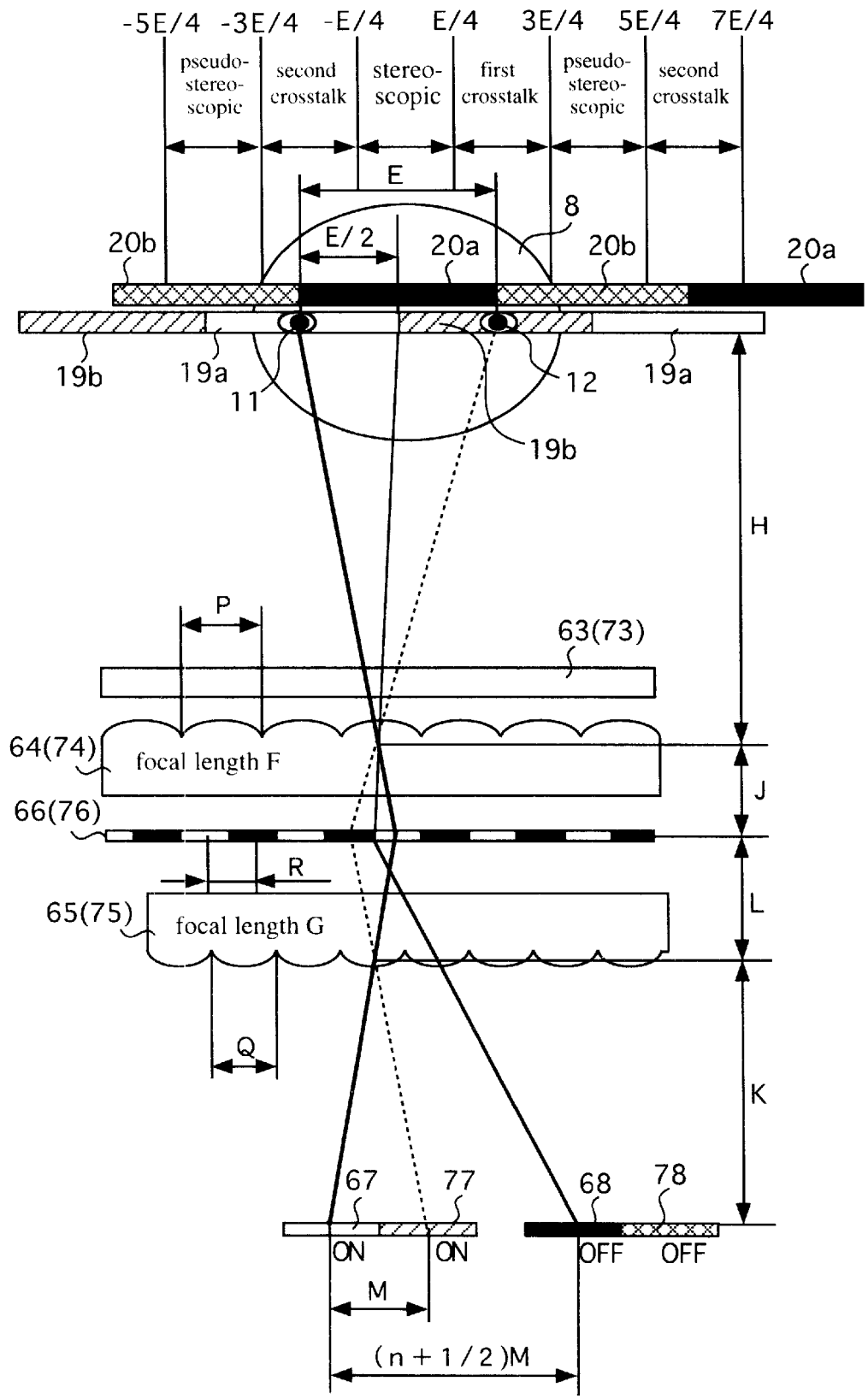
FIG. 18 is an explanatory view showing the disposition relationship among components in one one-eye system in the construction shown in FIG. 17.

Although FIG. 18 is a diagram showing one of the one-eye systems, the line-shaped light sources in the other one-eye system are also illustrated. FIGS. 19 to 22 illustrate the one-eye system for feeding an image to the right eye 11 of the viewer 8. In FIGS. 18 to 22, the line-shaped light source which is being turned on and the line-shaped light source which is not being turned on in the one-eye system I are respectively indicated by a solid white pattern and a solid black pattern, and the line-shaped light source which is being turned on and the line-shaped light source which is not being turned on in the one-eye system II are respectively indicated by hatching and crosshatching.

In FIG. 18, the viewer 8 is positioned in the center of a stereoscopic position right in front of a screen. Letting n be an integer, E be the distance between the eyes of the viewer 8, and A be the horizontal distance from the center of the stereoscopic position right in front of the screen, an area indicated by $(2n-½)×E \leq A \leq (2n+½)×E$ and an area indicated by $\{(2n+1)-½\}×E<A<\{(2n+1)+½\}×E$ on the basis of the center of the stereoscopic position right in front of the screen can be respectively taken as a stereoscopic area and a pseudostereoscopic area, and control paying attention to only the two areas can be also carried out.

However, crosstalk occurs in the vicinity of the boundary between the stereoscopic area and the pseudostereoscopic area. Therefore, it is desired that the vicinity of the boundary is taken as a crosstalk area, and proper control corresponding to the crosstalk area is carried out. An area indicated by $\{(1+2n)/2-¼\}×E<A<\{(1+2n)/2+¼\}×E$ is taken as a crosstalk area. In this case, in areas—E/4 to E/4, E/4 to 3E/4, 3E/4 to 5E/4, 5E/4 to 7E/4, 7E/4 to 9E/4 formed on the basis of the center of the stereoscopic position right in front of the screen, stereoscopic, crosstalk, pseudostereoscopic, crosstalk, stereoscopic, are set in this order. Crosstalk from stereoscopic to pseudostereoscopic is defined as first crosstalk, and crosstalk from pseudostereoscopic to stereoscopic is defined as second crosstalk.

Description is now made of the disposition relationship among the components, for example. Letting E be the distance between the eyes of the viewer 8, H be the distances between the viewer 8 and the second lenticular lens screen 64 or 74 (the center of the semi-cylindrical lens portion), J be the distance between the second lenticular lens screen 64 or 74 (the center of the semi-cylindrical lens portion) and the diffusing screen 66 or 76, L be the distance between the diffusing screen 66 or 76 and the first lenticular lens screen 65 or 75 (the center of the semi-cylindrical lens portion), and K be the distance between the first lenticular lens screen 65 or 75 (the center of the semi-cylindrical lens portion) and the light emitting unit 60 (70), the width M of each of the line-shaped light sources 67, 68, 77, and 78 satisfies $M = K \times E \times J/(L \times H)$.

Letting F be the focal length of each of the semi-cylindrical lens portions constituting the second lenticular lens screen 64, and G be the focal length of each of the semi-cylindrical lens portions constituting the first lenticular lens screen 65, $F = J \times H/(H-J)$ and $G = L \times K/(K-L)$ are satisfied. Letting P be the pitch between the semi-cylindrical lens portions constituting the second lenticular lens screen 64, and Q be the pitch between the semi-cylindrical lens portions constituting the first lenticular lens screen 65, $P = 2 \times E \times J/(J+H)$ and $Q = 2 \times K \times E \times J/(H \times (L+K))$ are satisfied. Letting n be an integer, the pitch between the line-shaped light sources satisfies $(n+\frac{1}{2}) \times M$.

Operations in the head tracking stereoscopic display (the contents of the control by the controller means 82) in cases where the viewer 8 is positioned in the stereoscopic area, the pseudostereoscopic area, and the crosstalk areas will be described on the basis of FIGS. 19 to 22. The positional relationship among the stereoscopic area, the pseudostereoscopic area, and the crosstalk areas is also illustrated in FIGS. 21 and 22.

Figure 19:
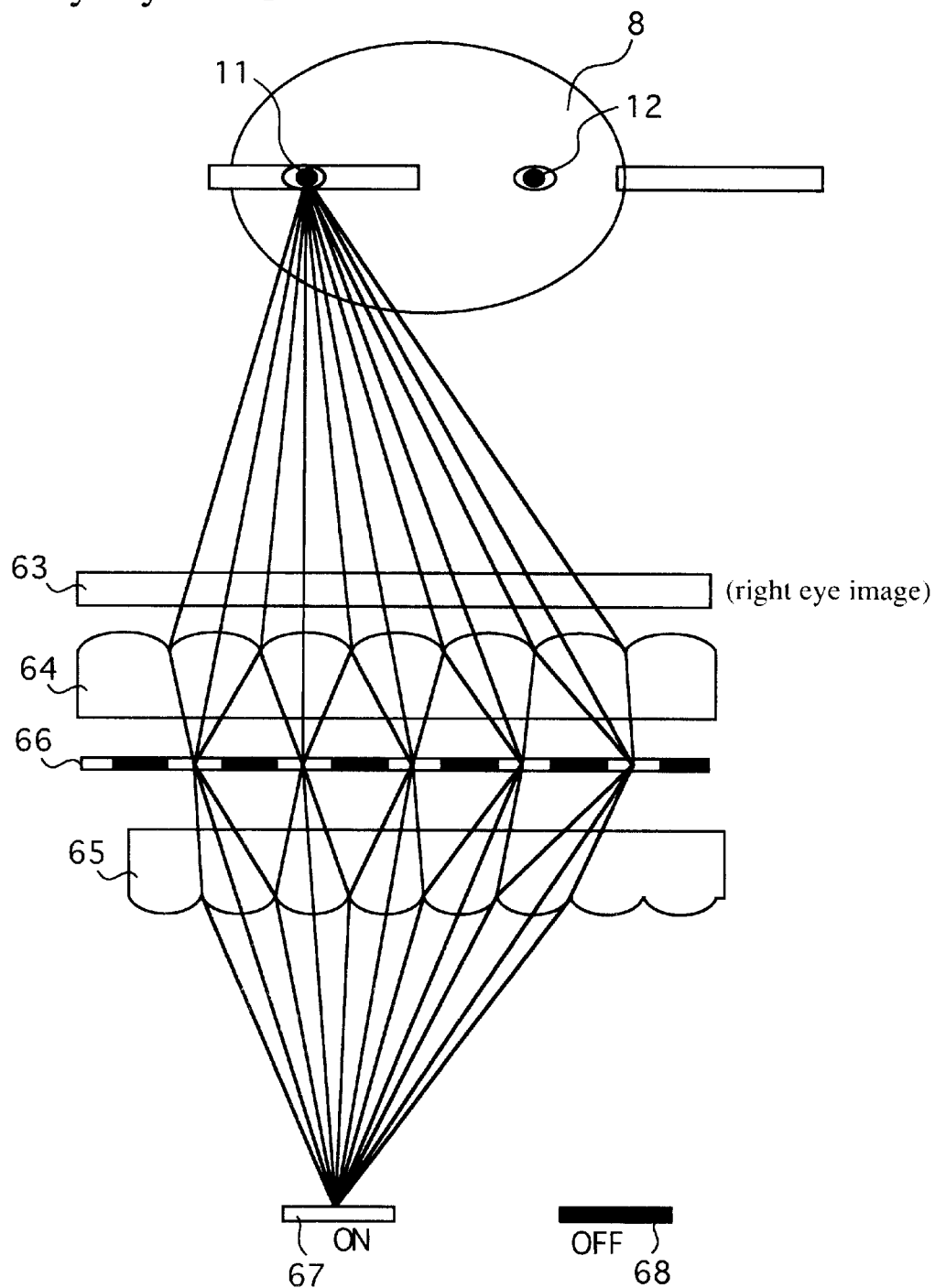
FIG. 19 is an explanatory view showing how light from a line-shaped light source is introduced into the right eye of a viewer positioned in a stereoscopic area by a one-eye system I in the construction shown in FIG. 17.

FIG. 19 illustrates a state where the viewer 8 is positioned in the stereoscopic area, and only the line-shaped light source 67 is being turned on, a right eye image is displayed on the image display panel 63, and the right eye image is inputted to the right eye 11 of the viewer 8 in the one-eye system I. More specifically, light from the line-shaped light source 67 is converged through the semi-cylindrical lens portions constituting the first lenticular lens screen 65, so that bright portions and dark portions are alternately formed on the diffusing screen 66. The bright portion becomes a light emitting source, and light emitted therefrom is introduced into the right eye 11 of the viewer 8 by the semi-cylindrical lens portion in the second lenticular lens screen 64. When the right eye image enters the right eye 11 of the viewer 8, as shown in FIG. 19, by the one-eye system I, the line-shaped light source 77 is turned on in the one-eye system II, so that a left eye image displayed on the image display panel 73 enters the left eye 12 of the viewer 8.

Figure 20:
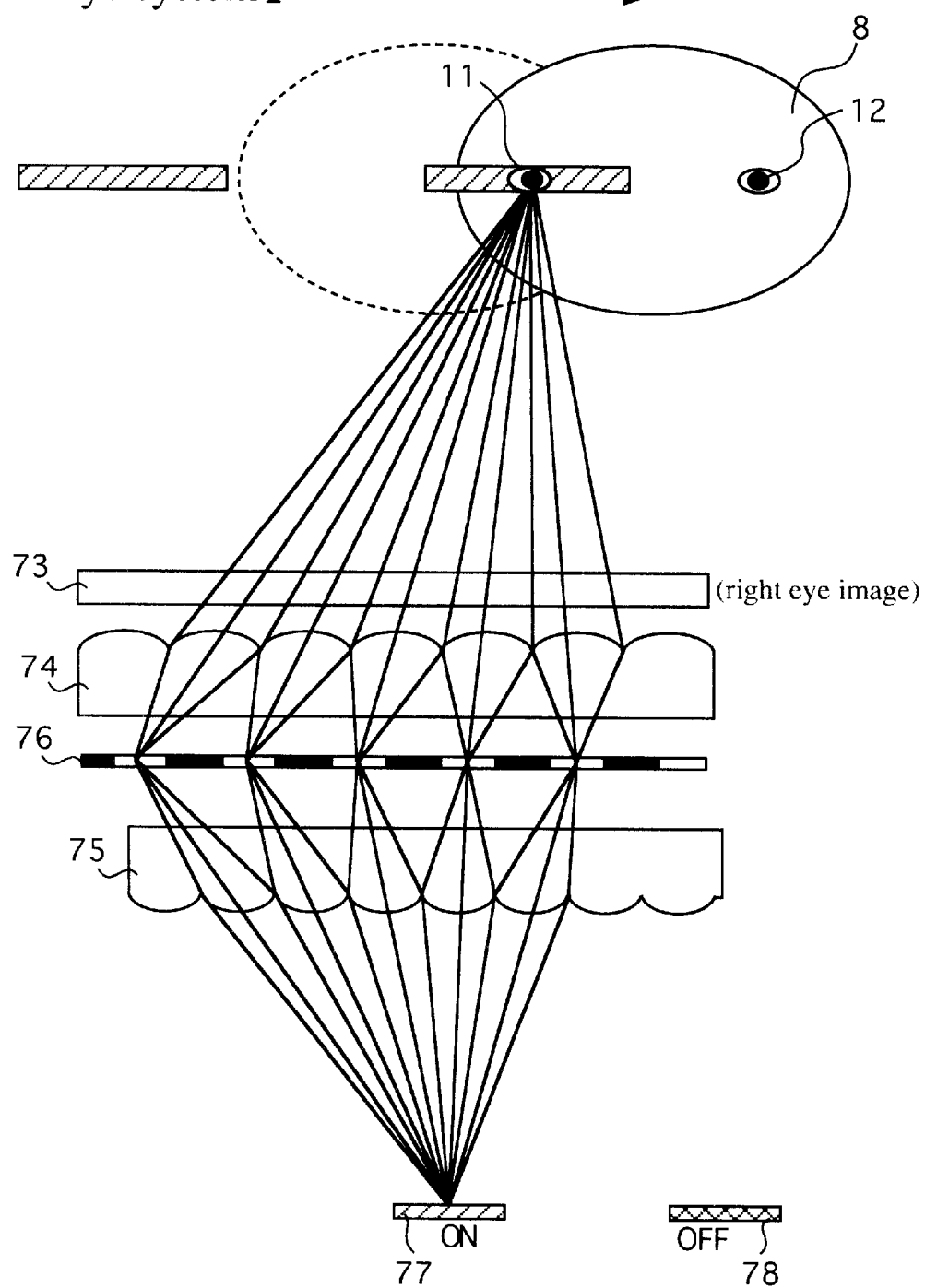
FIG. 20 is an explanatory view showing how light from a line-shaped light source is introduced into the right eye of a viewer positioned in a pseudostereoscopic area by a one-eye system II in the construction shown in FIG. 17.

FIG. 20 illustrates a state where the viewer 8 is positioned in the pseudostereoscopic area, and only the line-shaped light source 77 is being turned on, a right eye image is displayed on the image display panel 73, contrary to the above-mentioned case where the viewer 8 is positioned in the stereoscopic area, and the right eye image is inputted to the right eye 11 of the viewer 8 in the one-eye system II. When the right eye image enters the right eye 11 of the viewer 8, as shown in FIG. 20, by the one-eye system II, the line-shaped light source 67 is turned on in the one-eye system I, so that a left eye image is displayed on the image display panel 63, contrary to the above-mentioned case where the viewer 8 is positioned in the stereoscopic area, and the left eye image enters the left eye 12 of the viewer 8.

Figure 21:
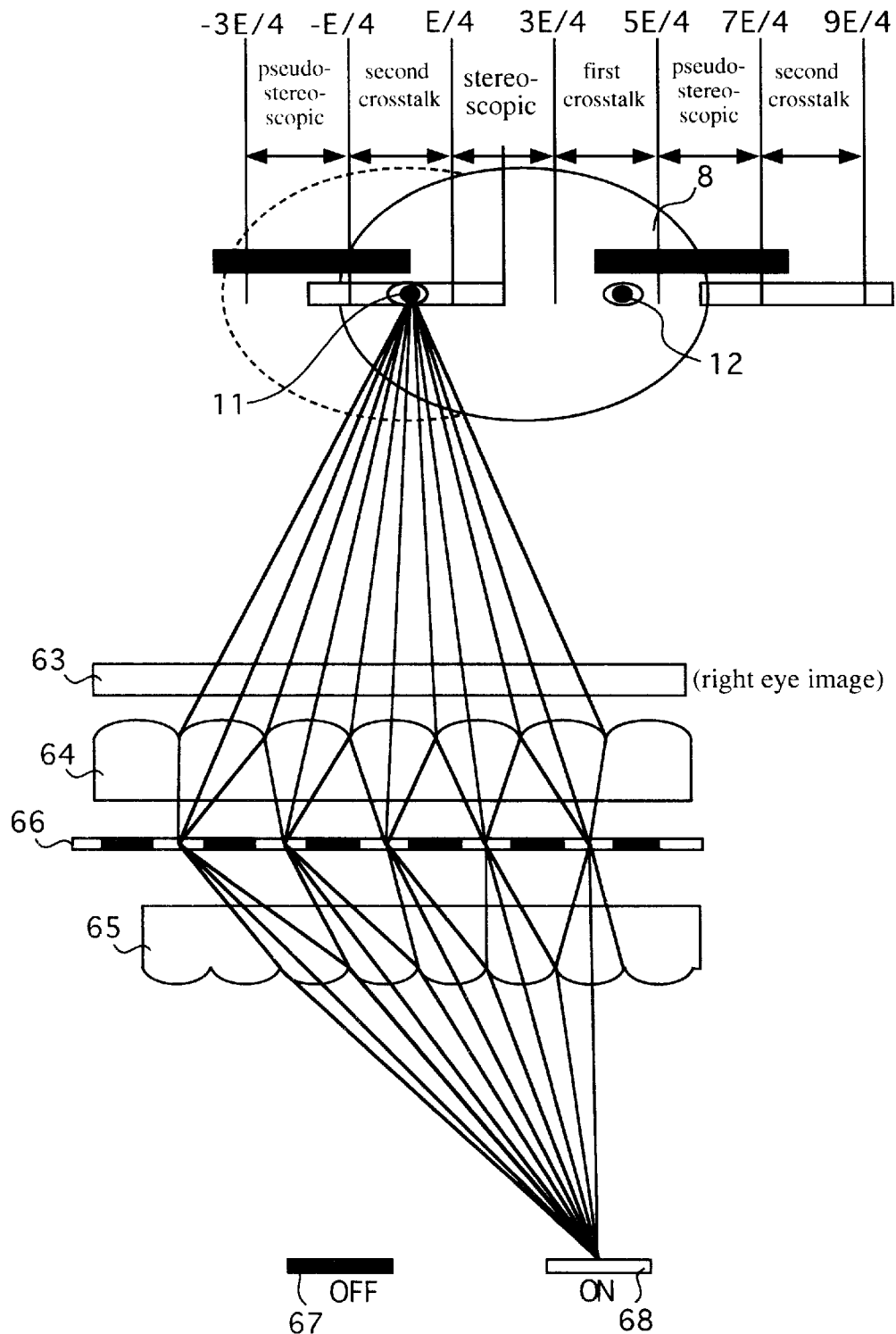
FIG. 21 is an explanatory view showing how light from a line-shaped light source is introduced into the right eye of a viewer positioned in a first crosstalk area by a one-eye system I in the construction shown in FIG. 17.
Figure 22:
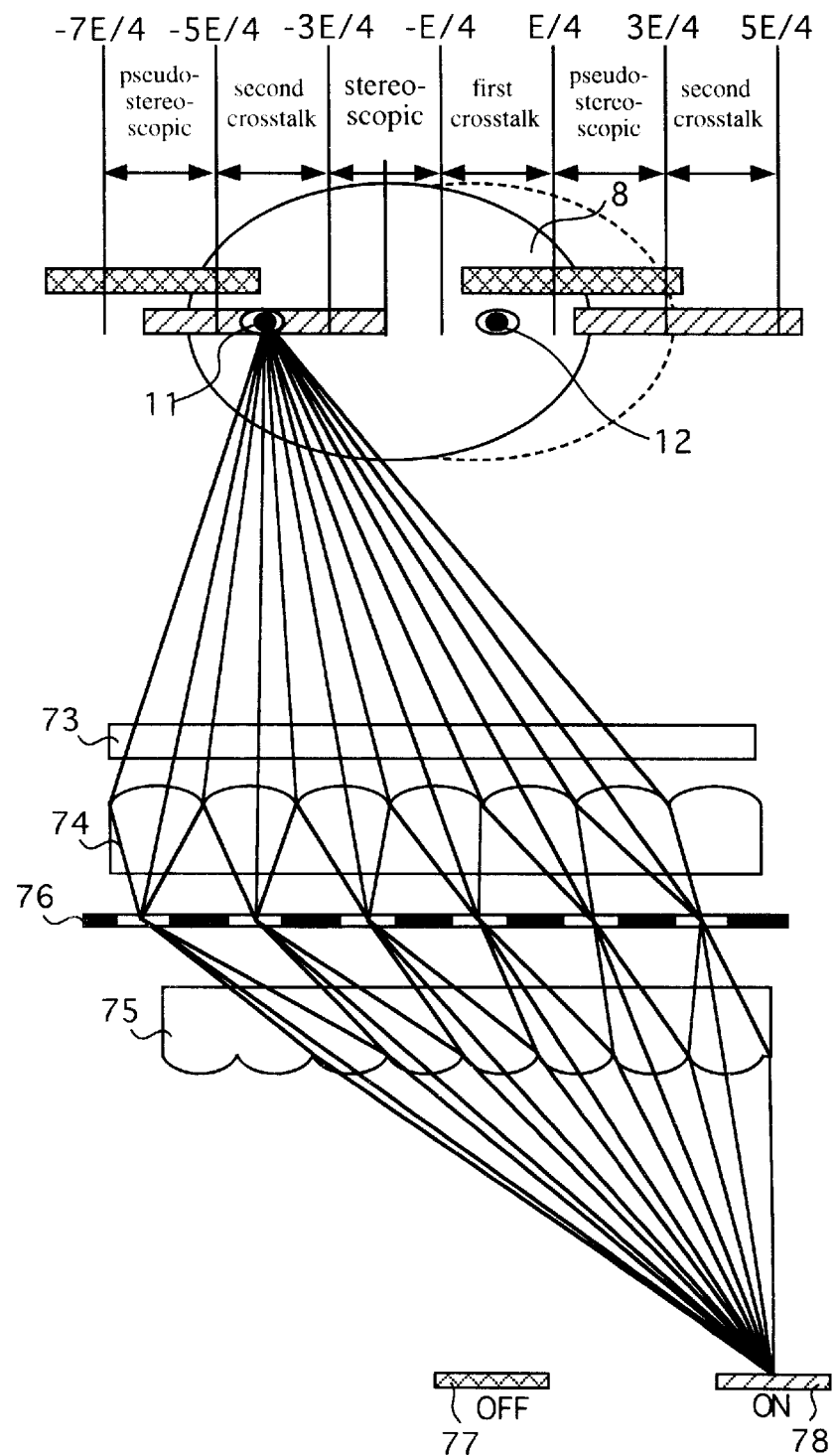
FIG. 22 is an explanatory view showing how light from a line-shaped light source is introduced into the right eye of a viewer positioned in a second crosstalk area by a one-eye system II in the construction shown in FIG. 17.

FIG. 21 illustrates a state where the viewer 8 is positioned in the first crosstalk area, and only the line-shaped light source 68 is being turned on, a right eye image is displayed on the image display panel 63, and the right eye image is inputted to the right eye 11 of the viewer 8 in the one-eye system I. When the right eye image enters the right eye 11 of the viewer 8, as shown in FIG. 21, by the one-eye system I, the line-shaped light source 77 is turned on in the one-eye system II, so that a left eye image displayed on the image display panel 73 enters the left eye 12 of the viewer 8.

FIG. 22 illustrates a state where the viewer 8 is positioned in the second crosstalk area, and only the line-shaped light source 78 is being turned on, a right eye image is displayed on the image display panel 73, contrary to the above-mentioned case where the viewer 8 is positioned in the first crosstalk area, and the right eye image is inputted to the right eye 11 of the viewer 8 in the one-eye system II. When the right eye image enters the right eye 11 of the viewer 8, as shown in FIG. 22, by the one-eye system II, the line-shaped light source 68 is turned on in the one-eye system I, so that a left eye image is displayed on the image display panel 63, contrary to the above-mentioned case where the viewer 8 is positioned in the first crosstalk area, and the left eye image enters the left eye 12 of the viewer 8.

In the above-mentioned construction, the light emitting units are constituted by the four line-shaped light sources 67, 68, 77, and 78, the first lenticular lens screens 65 and 75, the diffusing screens 66 and 76, and the second lenticular lens screens 64 and 74, so that the construction can be made simpler and the cost can be made lower, as compared with the conventional light emitting unit which is constituted by a combination of an imaging device and an image display device. Even when the viewer 8 moves from the stereoscopic position to the pseudostereoscopic position or moves from the stereoscopic position to the crosstalk area, it is also possible to properly view a 3D image by following the movement of the viewer 8. Although in comparison with the second embodiment, such control as to switch an image displayed on each of the image display panels 63 and 64 is required, the light emitting units may be the four line-shaped light sources.

In the above-mentioned embodiments, the line-shaped light source may be composed of an LED array or a discharge lamp. Alternatively, it may be composed of a fluorescent tube for accelerating electrons emitted from a cathode under vacuum at an anode and exciting a fluorescent screen formed at the anode to emit light.

Embodiment 4

A fourth embodiment of the present invention will be described on the basis of the drawings.

Description is now made of one example of a head tracking stereoscopic display capable of causing the viewer 8 to properly view a 3D image, when the head of the viewer 8 moves to a stereoscopic area, a pseudostereoscopic area, a first crosstalk area and a second crosstalk area, by following the movement using FIGS. 23 to 26.

The head tracking stereoscopic display comprises a plane-shaped back-light 501, a liquid crystal shutter 502 disposed on the light emission side of the back-light 501 and capable of alternately forming a light transmitting portion and a light shading portion each having a predetermined width in a vertical stripe shape and moving the light transmitting portion and the light shading portion by a pitch which is one-half of the width, a lenticular lens 503 disposed on the light emission side of the liquid crystal shutter 502 and constituted by semi-cylindrical lens portions corresponding to sets each comprising the light transmitting portion and the light shading portion, an image display panel 504 composed of a liquid crystal or the like, of a light transmission type which is disposed on the light emission side of the lenticular lens 503, a head position detecting device 505 for detecting the position of the head of the viewer 8, a controller 506, and illuminating means (not shown) for illuminating the face of the viewer 8.

Figure 24:
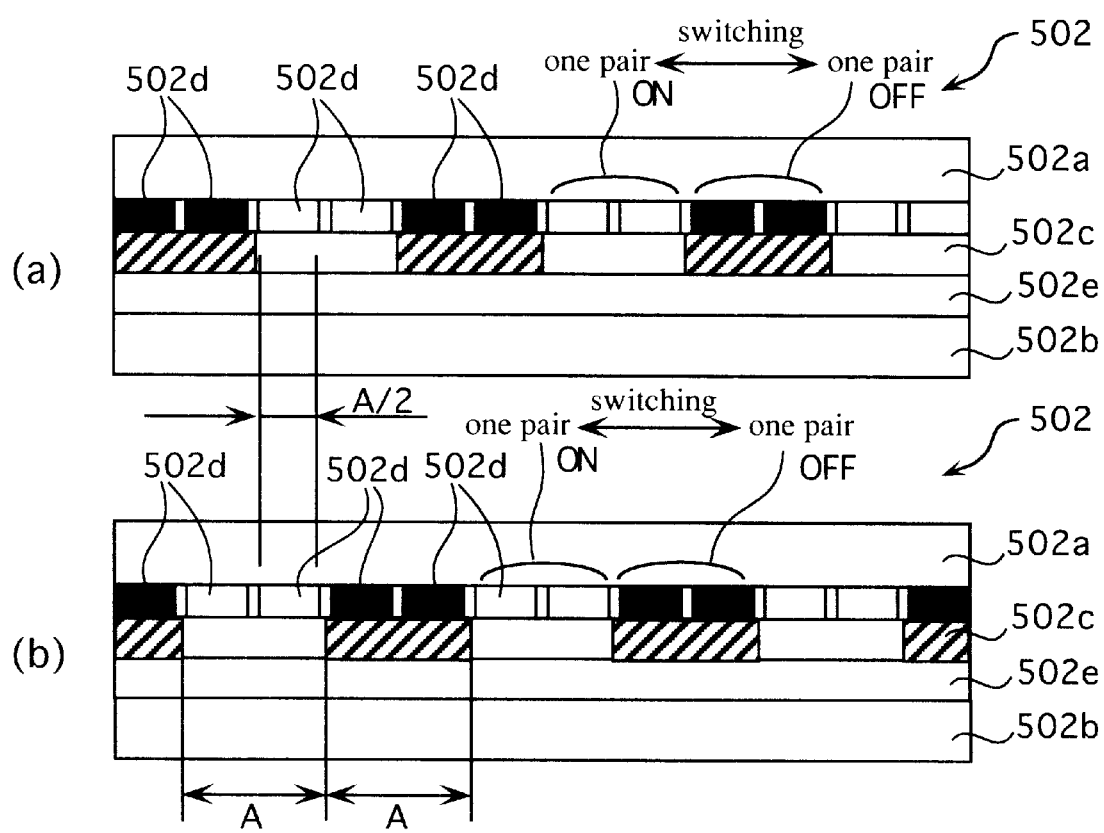
FIG. 24 is a diagram for explaining the operation of a liquid crystal shutter in the head tracking stereoscopic display shown in FIG. 23.

The liquid crystal shutter 502 is constructed as shown in FIGS. 24(*a*) and 24(*b*). In FIG. 24, reference numbers 502*a* and 502*b* denote transparent substrates disposed with a liquid crystal layer 502*c* interposed therebetween. Transparent conductive films 502*d* in a vertical stripe shape are formed, letting A be the width of the light transmitting portion (the width of the light shading portion), on the inner surface side of the transparent substrate 502*a* so as to have a width of A/2, and a transparent conductive film 502*e* in a hollow pattern is formed on the inner surface side of the transparent substrate 502*b*.

A polarizing plate is omitted in FIGS. 23 to 26. In FIG. 24, the conductive film 502*d* which is not energized is indicated by a solid black pattern, and the conductive film 502*d* which is energized is indicated by a solid white pattern. Light transmitting states of a liquid crystal are indicated by non-hatching and hatching, respectively, depending on whether or not the conductive film is energized.

The controller 506 comprises a display control circuit 506*a* and a shutter control circuit 506*b*. The display control circuit 506*a* controls the timing of display switching between a left eye image and a right eye image on the light transmission type image display panel 504 on the basis of information relating to the head position from the head position detecting device 505. The shutter control circuit 506*b* controls alternate switching between the light transmitting portion and the light shading portion in the liquid crystal shutter 502 in synchronization with the timing of display switching as well as movement at a predetermined pitch. The specific manner of the control will be described.
(When the viewer 8 is positioned in the pseudostereoscopic area)

In this case, the display control circuit 506*a* switches a left eye image and a right eye image at timing reverse to timing at which it switches a left eye image and a right eye image in a stereoscopic position. That is, the pseudostereoscopic position is a state where the right eye image is incident on the left eye, and the left eye image is incident on the right eye, so that the timing of alternate display of the left eye image and the right eye image may be reverse to that in the stereoscopic position.
(When the viewer 8 is positioned in the crosstalk area)

The shutter control circuit 506*b* carries out such control as to energize the liquid crystal shutter 502 such that the adjacent vertical stripe-shaped transparent electrodes 502*d* are turned on/off in pairs (a light transmitting/shading state). Such control makes it possible to move the light transmitting portion and the light shading portion in the liquid crystal shutter 502 by a pitch of A/2, as shown in FIGS. 24(*a*)(*b*).

The shutter control circuit 506*b* moves the light transmitting portion and the light shading portion by a pitch of A/2 from a state where the viewer 8 is in the stereoscopic area, as described above, when it obtains judgment information indicating that the viewer 8 is positioned in the crosstalk area (see FIGS. 25 and 26 with respect to the crosstalk area) from the head position detecting device 505, while further moving the light transmitting portion and the light shading portion by a pitch of A/2 when it obtains information indicating that the viewer 8 is positioned in the pseudostereoscopic area after further passing through the crosstalk area.

In the stage where the viewer 8 is positioned in the crosstalk area, the display control circuit 506*a* does not switch the left eye image and the right eye image at timing reverse to the timing in the stage where the viewer 8 is positioned in the stereoscopic area. The timing is reversed when the viewer 8 is positioned in the pseudostereoscopic area after passing through the crosstalk area.

Figure 25:
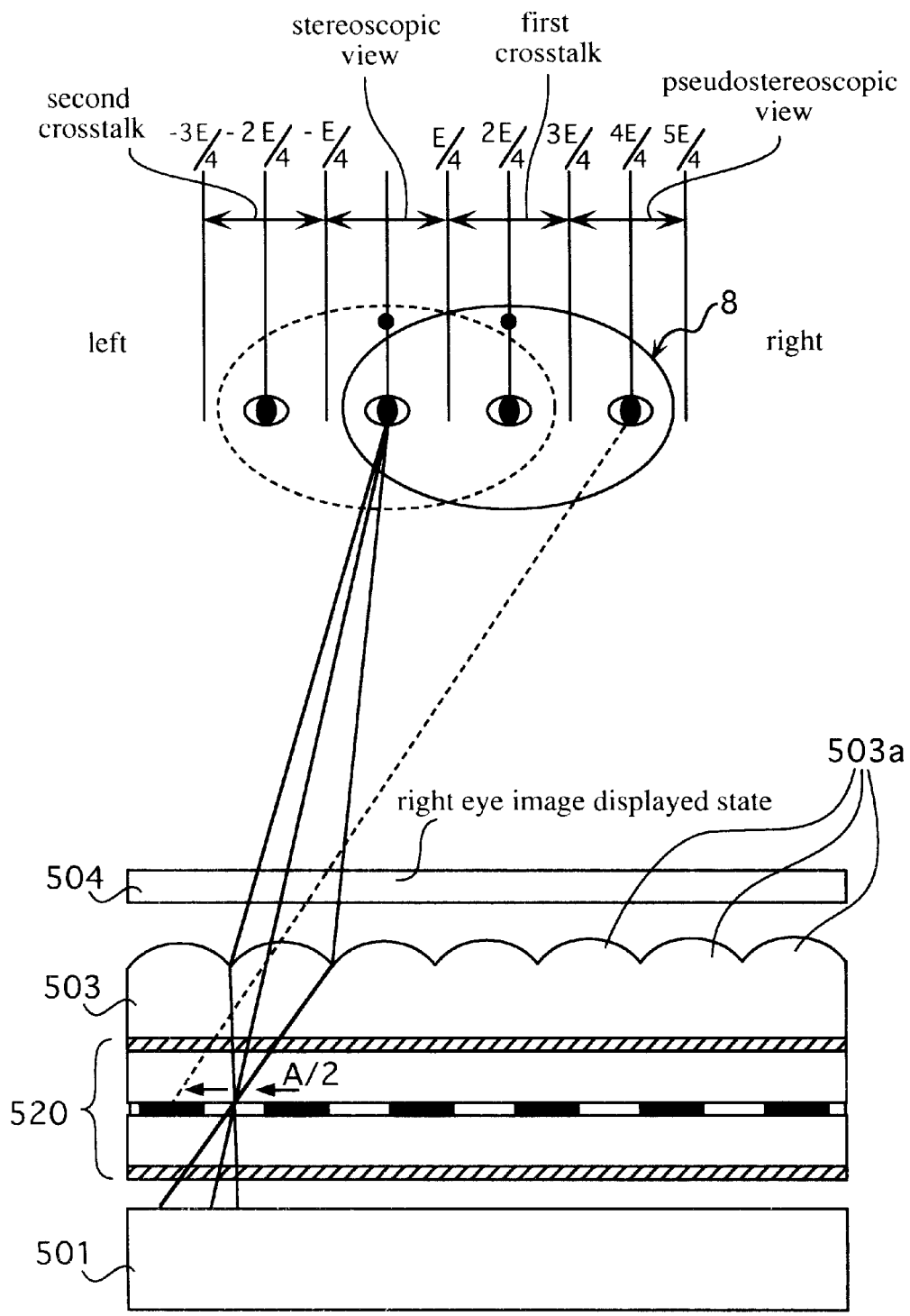
FIG. 25 is a diagram for explaining operations in the head tracking stereoscopic display shown in FIG. 23.

By such control, when the head of the viewer 8 is positioned in the first crosstalk area after moving by a distance of E/2 rightward from the stereoscopic area (a position indicated by a dotted line), for example, as shown in FIG. 25, the light shading portion and the light transmitting portion are moved by a pitch of A/2 leftward from the state where the viewer is in the stereoscopic area in correspondence with the movement (switching between the right and left eye images is the same as that in the state where the viewer is in the stereoscopic area). Consequently, a state where the right eye image is incident on the right eye of the viewer 8, and the left eye image is incident on the left eye of the viewer 8 is maintained, so that good stereoscopic view is possible.

Figure 26:
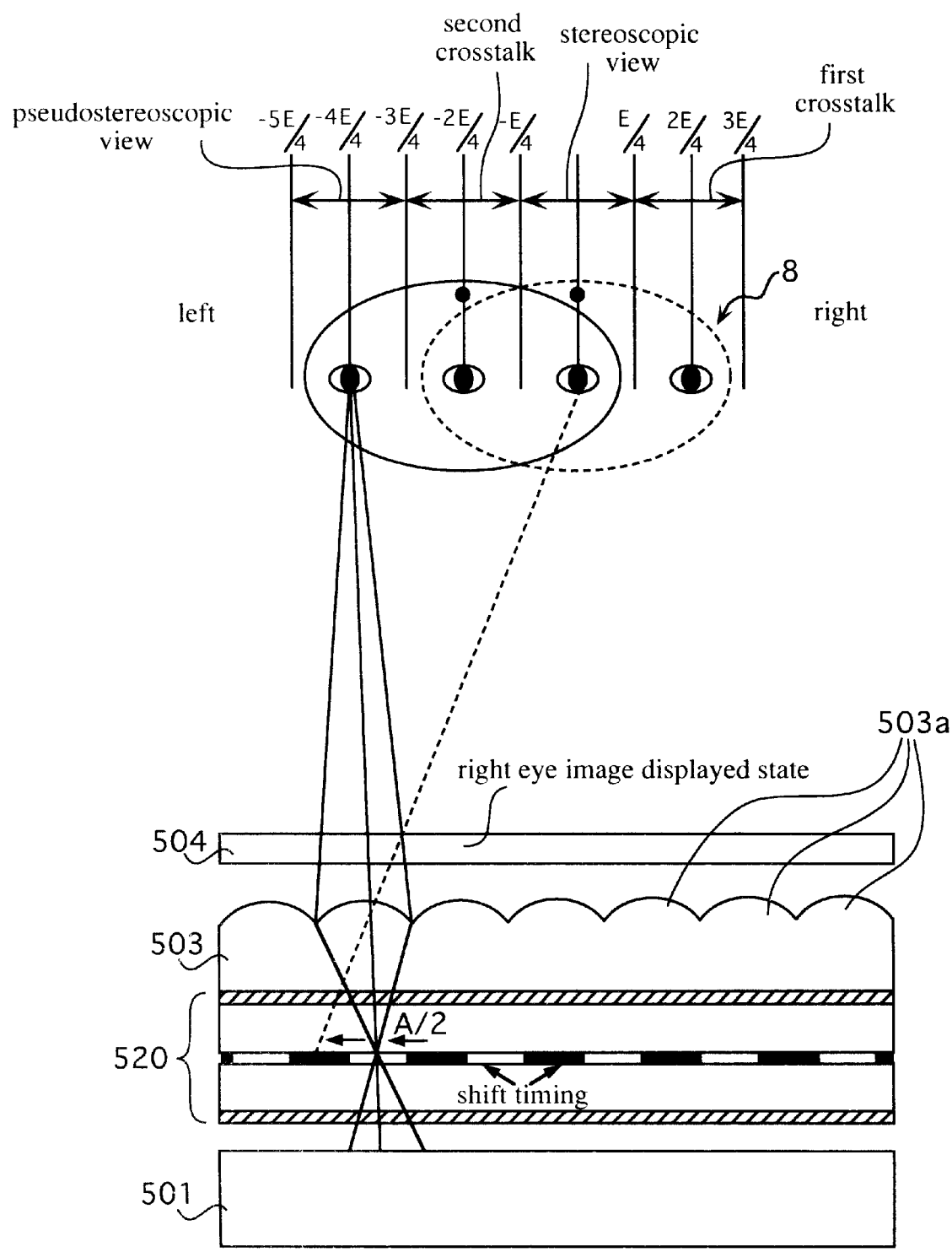
FIG. 26 is a diagram for explaining operations in the head tracking stereoscopic display shown in FIG. 23.

On the other hand, when the viewer 8 is positioned in the second crosstalk area after moving by a distance of E/2 leftward from the stereoscopic area, the light shading portion and the light transmitting portion may be moved by a pitch of A/2 rightward from the state where the viewer is in the stereoscopic area in correspondence with the movement. Also in this case, switching between the right and left eye images is the same as that in the state where the viewer is in the stereoscopic area. In addition to such control, when the viewer 8 is positioned in the crosstalk area after moving by a distance of E/2 leftward from the stereoscopic area, the light shading portion and the light transmitting portion may be moved by a pitch of A/2 leftward from the state where the viewer is in the stereoscopic area (which is the same as that in the above-mentioned case where the viewer moves rightward), as shown in FIG. 26, in correspondence with the movement, and the timing of switching between the right and left eye images may be the same timing as that in a state where the viewer is in the pseudostereoscopic area.

Figure 27:
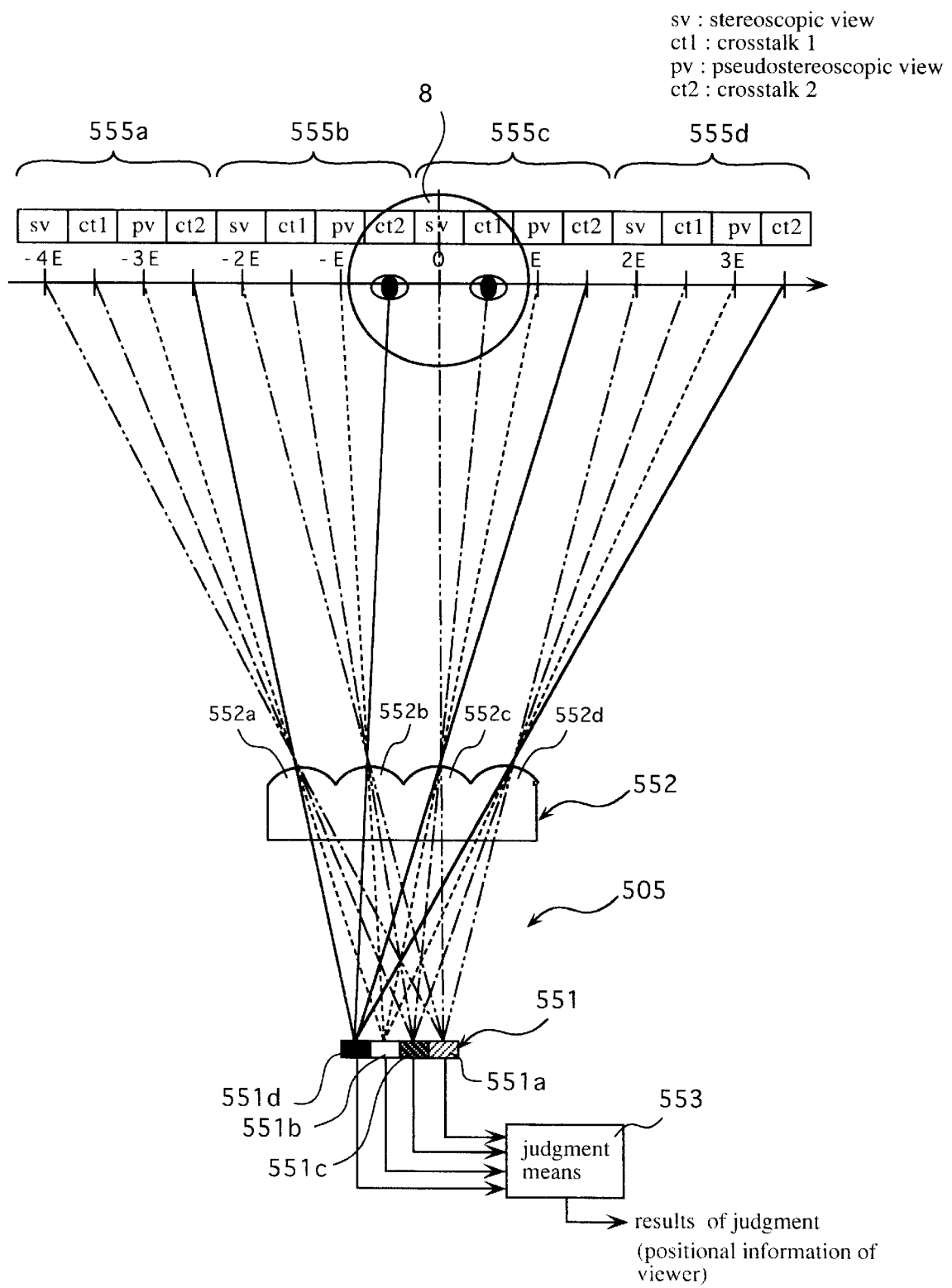
FIG. 27 is an explanatory view showing the details of a head position detecting device according to the present invention.

FIG. 27 is an explanatory view showing the detailed construction of the head position detecting device 505 for judging which of the stereoscopic area, the pseudostereoscopic area, the first crosstalk area and the second crosstalk area is an area where the viewer 8 is positioned. The head position detecting device 505 comprises light receiving means 551, a lenticular lens 552, and judgment means 553.

The light receiving means 551 is constructed by arranging a first light receiving device for a stereoscopic area 551*a*, a second light receiving device for a pseudostereoscopic area 551*b*, a third light receiving device for a first crosstalk area 551*c*, and a fourth light receiving device for a second crosstalk area 551*d* in the horizontal direction. If an example of the illuminating means for illuminating the face of the viewer 8 is one emitting infrared light, each of the light receiving devices may be one high in sensitivity to the infrared light.

The lenticular lens 552 is constructed by arranging four semi-cylindrical lens portions 552*a*, 552*b*, 552*c*, and 552*d* in the horizontal direction. The semi-cylindrical lens portions respectively introduce light reflected from the face of the viewer 8 positioned in the stereoscopic area, light reflected from the face of the viewer 8 positioned in the pseudostereoscopic area, light reflected from the face of the viewer 8 positioned in the first crosstalk area, and light reflected from the face of the viewer 8 positioned in the second crosstalk area into the first light receiving device 551*a*, the second light receiving device 551*b*, the third light receiving device 551*c*, and the fourth light receiving device 551*d*.

The judgment means 553 compares the amount of the light detected in the first light receiving device 551*a*, the amount of the light detected in the second light receiving device 551*b*, the amount of the light detected in the third light receiving device 551*c*, and the amount of the light detected in the fourth light receiving device 551*d*, to judge which of the stereoscopic area, the pseudostereoscopic area, the first crosstalk area and the second crosstalk area is an area where the viewer 8 is positioned. For example, if the amount of the light detected in the first light receiving device 551*a* is the largest, it is judged that the viewer is positioned in the stereoscopic area.

Let n be an integer, E be the distance between the eyes of the viewer 8, and A be the horizontal distance from the center of a stereoscopic position right in front of a screen. In this case, when an area indicated by $(2n-\frac{1}{2}) \times E \leq A \leq (2n+\frac{1}{2}) \times E$ and an area indicated by $\{(2n+1)-\frac{1}{2}\} \times E < A < \{(2n+1)+\frac{1}{2}\} \times E$ on the basis of the center of the stereoscopic position right in front of the screen are respectively taken as the stereoscopic area and the pseudostereoscopic area, the stereoscopic area, the pseudostereoscopic area, the stereoscopic area, are formed in this order. This one cycle is repeated for each distance which is twice the distance between the eyes.

Furthermore, in this case, when an area indicated by $\{(1+2n)/2-\frac{1}{4}\} \times E < A < \{(1+2n)/2+\frac{1}{4}\} \times E$ is taken as the crosstalk area, the stereoscopic area, the first crosstalk area, the pseudostereoscopic area, the second crosstalk area, the stereoscopic area, . . . are formed in this order. This one cycle (hereinafter referred to as one object area for convenience, and object areas are respectively assigned reference numbers 555*a*, 555*b*, 555*c*, and 555*d* in FIG. 27) is repeated for each distance which is twice the distance between the eyes.

As described above, the four semi-cylindrical lens portions 552*a*, 552*b*, 552*c*, and 552*d* are arranged in the horizontal direction, so that it is possible to cope with the four object areas 555*a*, 555*b*, 555*c*, and 555*d* whose number corresponds to the number of the lens portions. Since the lenticular lens 552 is used as one thus constructed by arranging the plurality of semi-cylindrical lens portions 552*a*, 552*b*, 552*c*, and 552*d* in the horizontal direction, the number of components can be made smaller and the assembly thereof can be made easier, as compared with a case where the semi-cylindrical lens portions are separately constructed.

Figure 28:
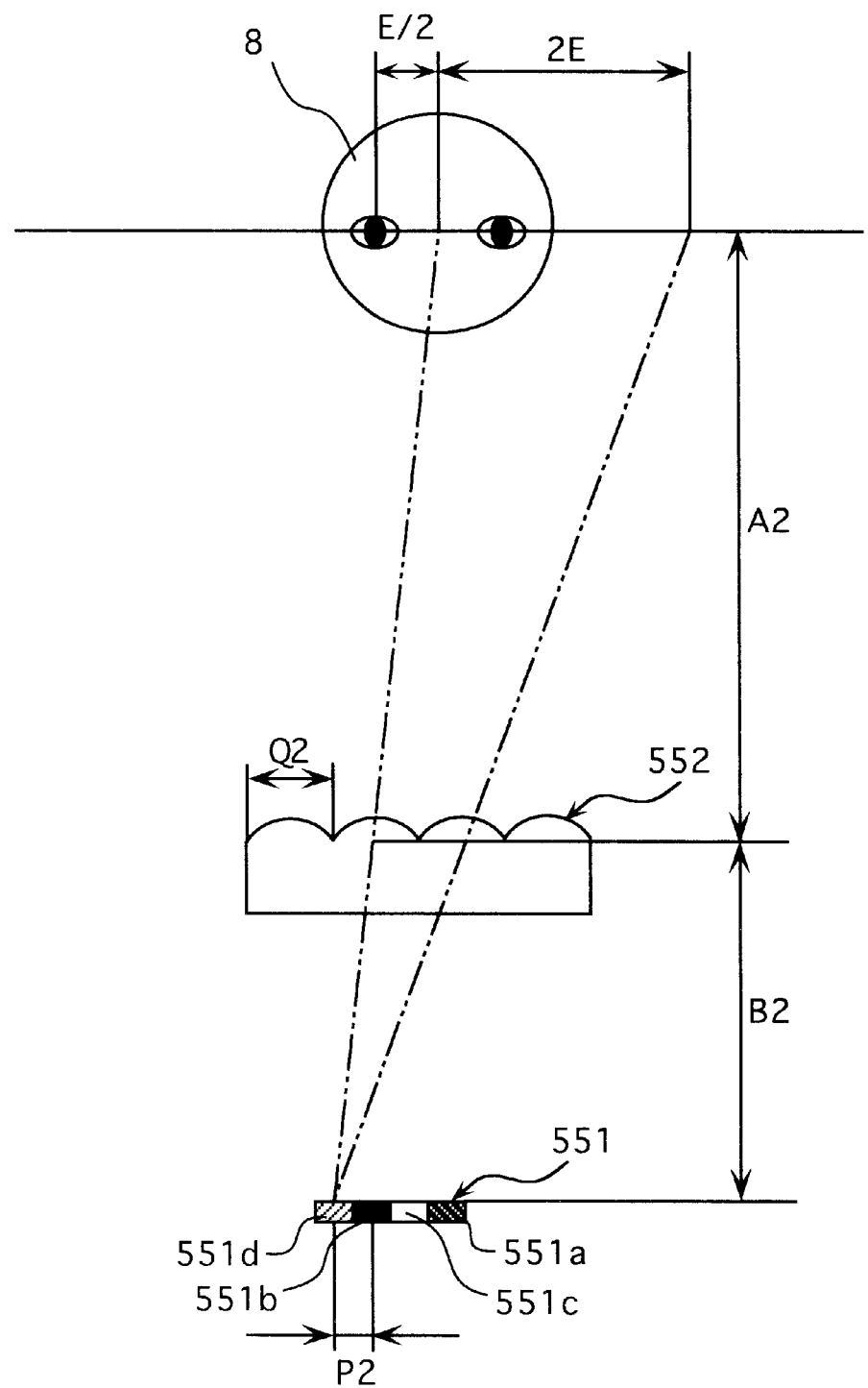
FIG. 28 is an explanatory view showing the disposition relationship among components in the head position detecting device shown in FIG. 27.

FIG. 28 is an explanatory view showing the dimensions in disposition, for example, of components in the head position detecting device 505. Letting E be the distance between the eyes of the viewer 8, A2 be the distance between the lenticular lens 552 (the center of the semi-cylindrical lens portion) and the viewer 8, B2 be the distance between the lenticular lens 552 (the center of the semi-cylindrical lens portion) and the light receiving device, and P2 be the pitch between the light receiving devices 551, $P2 = E \times B2/(2 \times A2)$ is satisfied. Further, letting Q2 be the pitch among the semi-cylindrical lens portions 552*a*, 552*b*, 552*c*, and 552*d*, $Q2 = 2 \times E \times B2/(A2+B2)$ is satisfied. Furthermore, letting F2 be the focal length of each of the semi-cylindrical lens portions 552*a*, 552*b*, 552*c*, and 552*d*, $F2 = A2 \times B2/(A2 \times B2)$ is satisfied.

Embodiment 5

Figure 23:
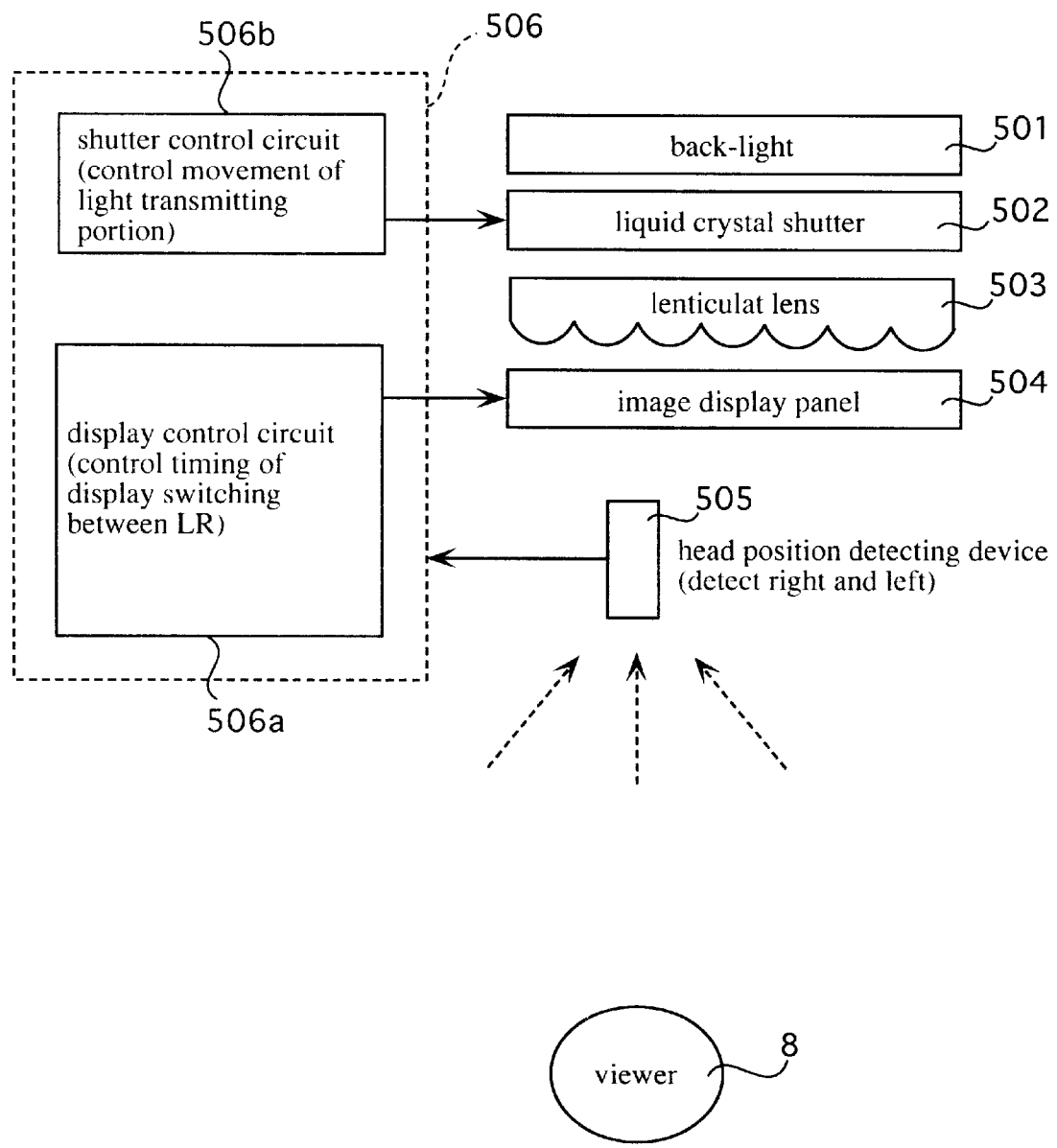
FIG. 23 is a block diagram showing the schematic construction of a head tracking stereoscopic display according to a fourth embodiment of the present invention.
Figure 29:
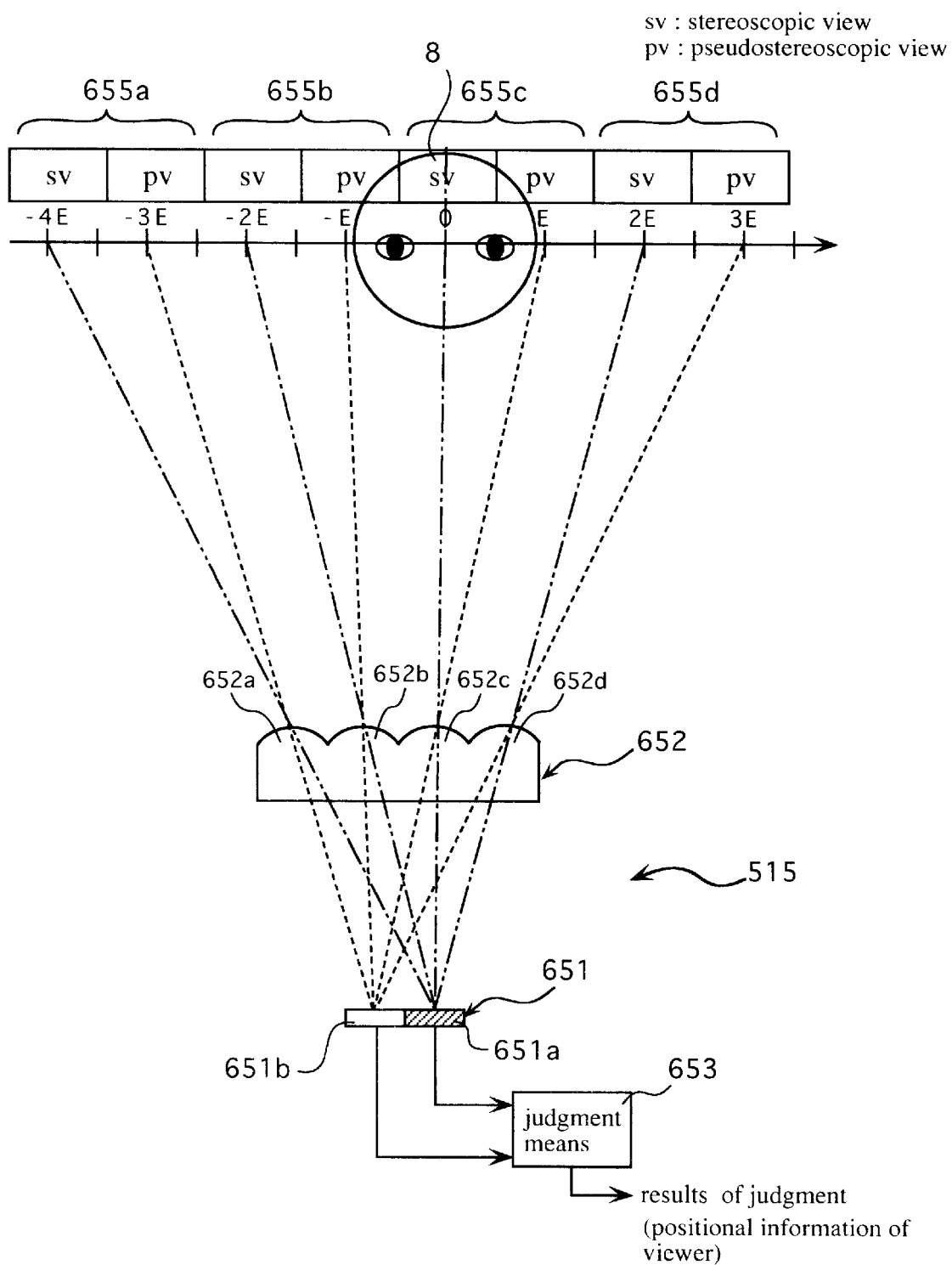
FIG. 29 is an explanatory view showing the details of a head position detecting device according to a fifth embodiment of the present invention.

FIG. 29 is an explanatory view showing the detailed construction of a head position detecting device 515 for judging which of a stereoscopic area and a pseudostereoscopic area is an area where a viewer 8 is positioned. When the head position detecting device 515 is used, a liquid crystal shutter 502 may be so constructed as to switch a light transmitting portion and a light shading portion by the width of the light transmitting portion and the light shading portion in the head tracking stereoscopic display constructed as shown in FIG. 23.

The head position detecting device 515 comprises light receiving means 651, a lenticular lens 652, and judgment means 653.

The light receiving means 651 is constructed by arranging a first light receiving device for a stereoscopic area 651*a* and a second light receiving device for a pseudostereoscopic area 651*b* in the horizontal direction.

The lenticular lens 652 is constructed by arranging four semi-cylindrical lens portions 652*a*, 652*b*, 652*c*, and 652*d* in the horizontal direction. Each of the semi-cylindrical lens portions introduces light reflected from the face of the viewer 8 positioned in the stereoscopic area and light reflected from the face of the viewer 8 positioned in the pseudostereoscopic area, respectively, into the first light receiving device 651*a* and the second light receiving device 651*b*.

The judgment means 653 compares the amount of the light detected in the first light receiving device 651*a* and the amount of the light detected in the second light receiving device 651*b*, to judge which of the stereoscopic area and the pseudostereoscopic area is an area where the viewer 8 is positioned. For example, if the amount of the light detected in the first light receiving device 651*a* is the largest, it is judged that the viewer is positioned in the stereoscopic area.

When an area indicated by $(2n-\frac{1}{2}) \times E \leq A \leq (2n+\frac{1}{2}) \times E$ and an area indicated by $\{(2n+1)-\frac{1}{2}\} \times E < A < \{(2n+1)+\frac{1}{2}\} \times E$ on the basis of the center of a stereoscopic positioning right in front of a screen are respectively taken as the stereoscopic area and the pseudostereoscopic area, the stereoscopic area, the pseudostereoscopic area, the stereoscopic area, . . . are formed in this order. This one cycle (which is referred to as one object area for convenience, and object areas are respectively assigned reference numbers 655*a*, 655*b*, 655*c*, and 655*d* in FIG. 28) is repeated for each distance which is twice the distance between the eyes.

As described above, the four semi-cylindrical lens portions 652*a*, 652*b*, 652*c*, and 652*d* are arranged in the horizontal direction, so that it is possible to cope with the four object areas 655*a*, 655*b*, 655*c*, and 655*d* whose number corresponds to the number of the lens portions. Since the lenticular lens 652 is used as one thus constructed by arranging the plurality of semi-cylindrical lens portions 652*a*, 652*b*, 652*c*, and 652*d* in the horizontal direction, the number of components can be made smaller and the assembly thereof can be made easier, as compared with a case where the semi-cylindrical lens portions are separately constructed.

Figure 30:
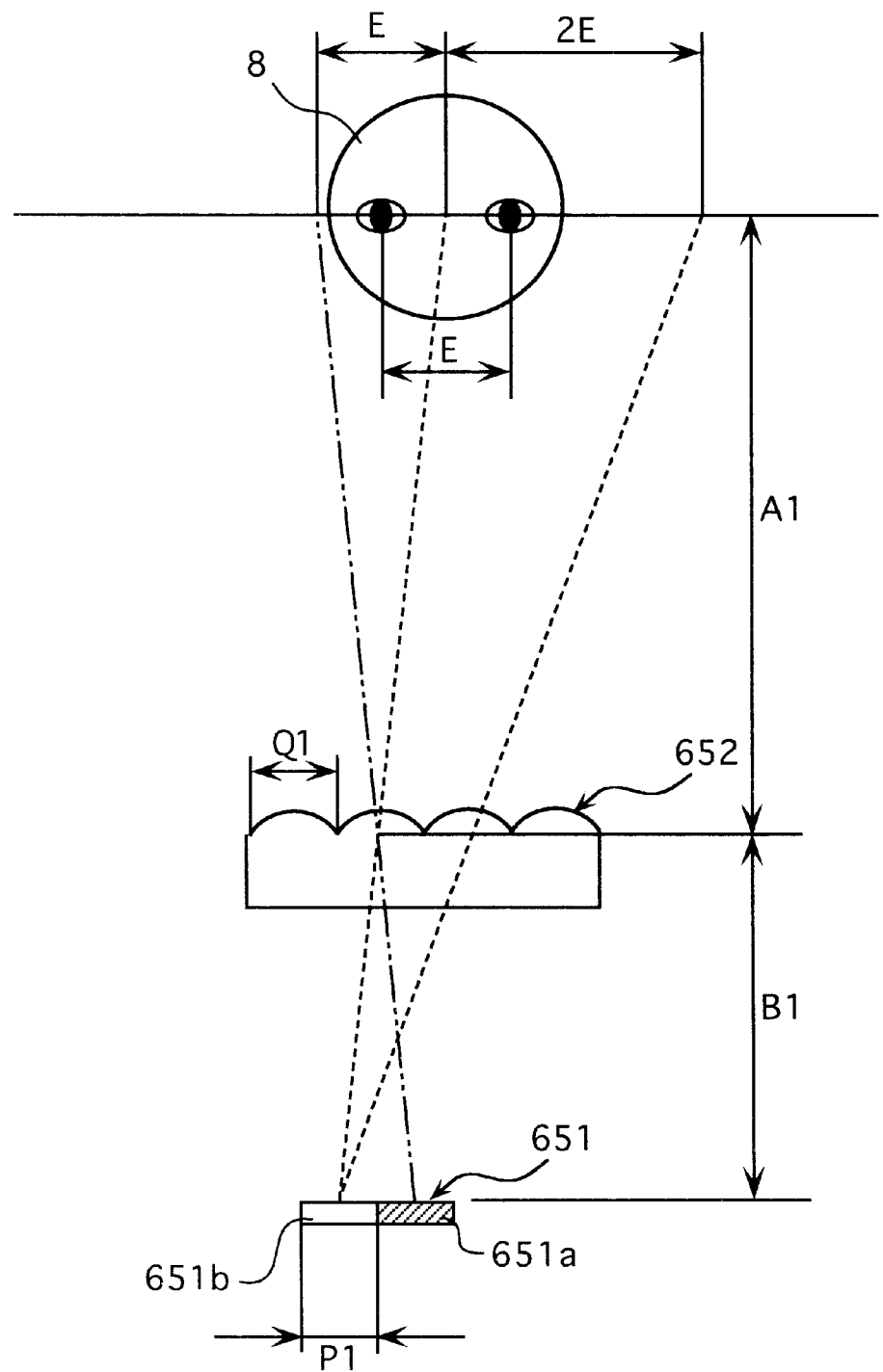
FIG. 30 is an explanatory view showing the disposition relationship among components in the head position detecting device shown in FIG. 29.
Figure 31:
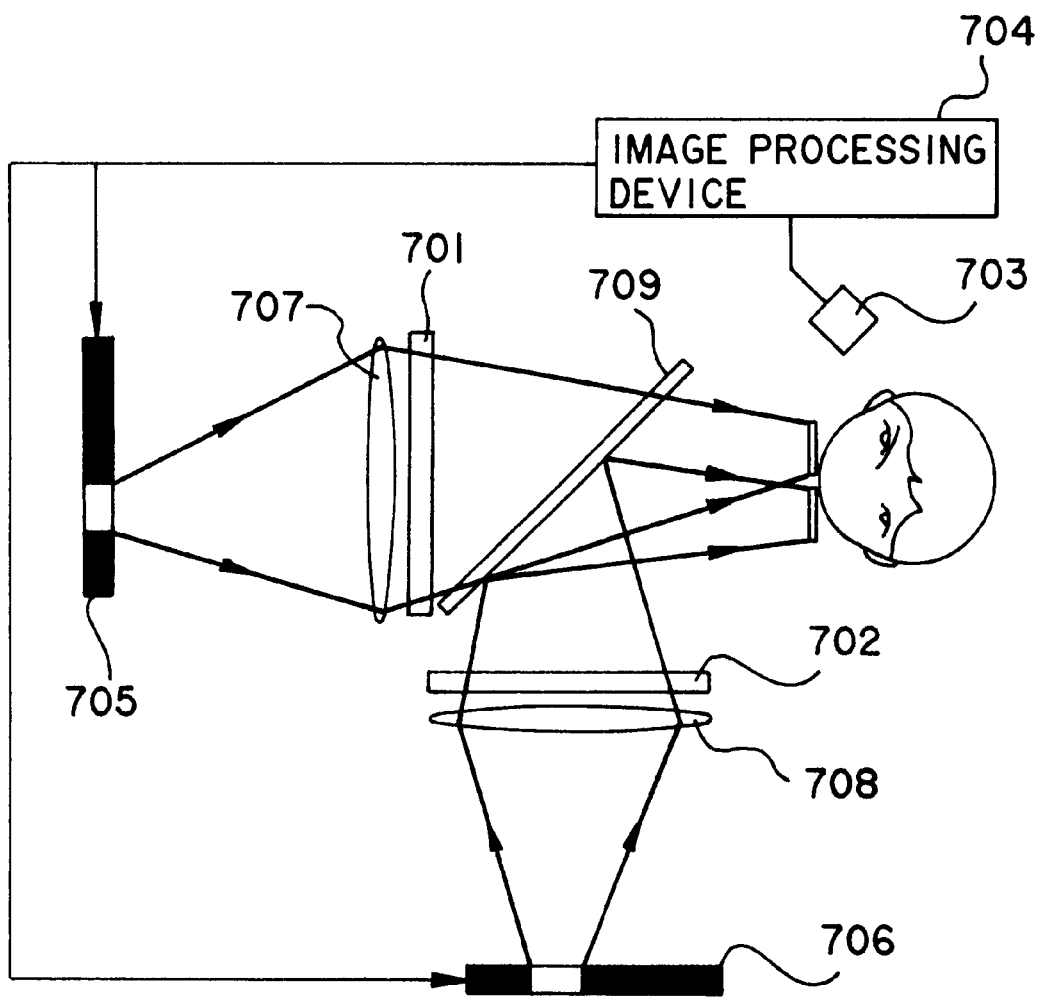
FIG. 31 is a schematic view showing a conventional head tracking stereoscopic display.

FIG. 30 is an explanatory view showing the dimensions in disposition of components, for example, in the head position detecting device 515. Letting E be the distance between the eyes, A1 be the distance between the lenticular lens 652 (the center of the semi-cylindrical lens portion) and the viewer 8, B1 be the distance between the lenticular lens 652 (the center of the semi-cylindrical lens portion) and the light receiving device 651, and P1 be the pitch between the first light receiving devices and the second light receiving devices, P1 E×B1/A1 is satisfied. Further, letting Q1 be the pitch among the semi-cylindrical lens portions 652a, 652b, 652c, and 652d, Q1=2×E×B1/(A1+B1) is satisfied. Furthermore, letting F1 be the focal length of each of the semi-cylindrical lens portions 652a, 652b, 652c, and 652d, F1=A1×B1/(A1×B1) is satisfied.

Although description of the head position detecting device was made of the head tracking stereoscopic display so constructed that the entire right and left eye images are alternately displayed in time on the image display panel, it goes without saying that the head tracking stereoscopic display may be so constructed that right and left eye images are displayed alternately in position in a vertical stripe shape, and that the images are separated from each other by a parallax barrier or a lenticular lens. The head tracking stereoscopic display may be of any construction, provided that the right eye image and the left eye image can be respectively introduced into the right eye and the left eye of the viewer without requiring special glasses.

Although an example of the light source is one comprising a back-light and a liquid crystal shutter, the present invention is not limited to the same. For example, it may be so constructed that light from a line-shaped light source causes bright and dark portions to be alternately formed at a predetermined pitch on a dispersion panel by a lenticular lens, and the bright and dark portions are utilized like the light transmitting portion and the light shading portion in the construction shown in FIG. 23, and an example of the line-shaped light source is one comprising a total of four line-shaped light sources, that is, one set of line-shaped light sources corresponding to the right and left eyes in a stereoscopic area (or a pseudostereoscopic area) and the other set of light-shaped light sources corresponding to the right and left eyes in a crosstalk area.

Although the number of image display panels is set to one, and the right and left eye images are alternately displayed thereon at predetermined timing, the head tracking stereoscopic display may be so constructed as to respectively display a left eye image and a right eye image on two image display panels, synthesize the images by a half mirror, and introduce to a viewer a composite image which has been obtained by the synthesis.

The head position detecting device and the head tracking stereoscopic display may be composed of separate cases so that the head position detecting device is provided separately from the head tracking stereoscopic display, or the head position detecting device is incorporated into the head tracking stereoscopic display.

Although the head position detecting device 505 (515) has semi-cylindrical lens portions as lens means, it goes without saying that it may comprise spherical surface lenses as lens means. Further, in a case where the head position detecting device has a lenticular lens, and the head tracking stereoscopic display also has a lenticular lens, it is also possible to employ such a structure that the lenticular lens in the head tracking stereoscopic display is also used as the lenticular lens in the head position detecting device depending on the method of a stereoscopic display system and the lenticular lens, for example.

Although in the above-mentioned embodiment, the illuminating means is provided for illuminating the face of the viewer 8, the illuminating means is not necessarily required. For example, if a black board or the like is disposed on the side of the background of the viewer, only the face of the viewer is brightened, so that it is possible to detect the head of the viewer even under a light such as a fluorescent lamp in an ordinary room.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A head tracking stereoscopic display comprising:

light emitting means comprising at least two combining light sources, each combining light source comprised of a set of two line-shaped light sources for one of the eyes and the other eye, the two line-shaped light sources being for a first area and a second area in a position shifted by approximately E/2 (E is the distance between the eyes of a viewer) in the horizontal direction from the first area;

a diffusing screen provided on the light emission side of said light emitting means;

a first lenticular long screen provided between said diffusing screen and the light emitting means for focusing light from a selected one of the line-shaped light sources and alternately forming bright portions and dark portions on said diffusing screen by semi-cylindrical lens portions constituting the first lenticular lens screen;

a second lenticular lens screen provided on the light emission side of said diffusing screen and having the function of taking each of said bright portions formed on the diffusing screen as a light source for either one of the eyes;

an image display panel provided on the light emission side of the second lenticular lens screen;

light source control means for alternately turning one of the line-shaped light sources and the other line-shaped light source in a selected one combining light source on and off;

display control means for alternately displaying one of the images and the other image which have binocular parallax on said image display panel in synchronization with an alternate ON/OFF of said line-shaped light sources;

head position detection means for detecting the position of the head of the viewer; and control means for carrying out control as to change the timing of an alternate display of the images and select the line-shaped light sources on the basis of information relating to the head position from said head position detection means, wherein said control means is constructed to carry out control, letting n be an integer, E be the distance between the eyes of the viewer, and A be the horizontal distance from the center of a stereoscopic position right in front of a screen, to perform basic processing in selecting the timing of the alternate display of the images and the combining light sources when the viewer is in an area indicated by $(2n-\frac{1}{2}) \times E \leq A \leq (2n+\frac{1}{2}) \times E$ on the basis of the center of the stereoscopic position right in front of the screen, while changing the timing of the alternate display of one of the images and the other image which have binocular parallax using as a light source to be selected the line-shaped light sources for the first area as it is when the viewer moves to an area indicated by $\{(2n+1)-\frac{1}{2}\} \times E < A < \{(2n+1)+\frac{1}{2}\} \times E$.

2. The head tracking stereoscopic display according to claim 1, wherein said control means is constructed to carry out control, letting n be an integer, E be the distance between the eyes of the viewer, and A be the horizontal distance from the center of a stereoscopic position right in front of a screen, as to select the two-lined light sources for the second area and suitably change or maintain the alternate display when the viewer moves to an area indicated by $\{(1+2n)/2-\frac{1}{4}\} \times E < A < \{(1+2n)/2+\frac{1}{4}\} \times E$ on the basis of the center of the stereoscopic position right in front of the screen.

3. A head tracking stereoscopic display comprising:

light emitting means comprising at least two combining light sources each combining light source comprised of a set of two line-shaped light sources for one of the eyes and the other eye, the two line-shaped light sources being for a first area and a second area in a position shifted by approximately E/2 (E is the distance between the eyes of a viewer) in the horizontal direction from the first area;

a diffusing screen provided on the light emission side of said light emitting means;

a first lenticular lens screen provided between said diffusing screen and the light emitting means for focusing light from a selected one of the line-shaped light sources and alternately forming bright portions and dark portions on said diffusing screen by semi-cylindrical lens portions constituting the first lenticular lens screen;

a second lenticular lens screen provided on the light emission side of said diffusing screen and having the function of taking each of said bright portions formed on the diffusing screen as a light source for either one of the eyes;

an image display panel provided on the light emission side of the second lenticular lens screen;

light source control means for alternately turning one of the line-shaped light sources and the other line-shaped light source in a selected one combining light source on and off;

display control means for alternately displaying one of the images and the other image which have binocular parallax on said image display panel in synchronization with an alternate ON/OFF of said line-shaped light sources;

head position detection means for detecting the position of the head of the viewer; and control means for carrying out control as to change the timing of an alternate display of the images and select the line-shaped light sources on the basis of information relating to the head position from said head position detection means, wherein letting E be the distance between the eyes of the viewer, H be the distance between the viewer and the second lenticular lens screen, J be the distance between the second lenticular lens screen and the diffusing screen, L be the distance between the diffusing screen and the first lenticular lens screen, and K be the distance between the first lenticular lens screen and the light emitting means, the pitch S between the line-shaped light sources in each of the combining light sources satisfies the following equation:

$$S = K \times E \times J / (L \times H).$$

4. The head tracking stereoscopic display according to claim 3, wherein letting F be the focal length of each of semi-cylindrical lens portions constituting the second lenticular lens screen, and G be the focal length of each of the semi-cylindrical lens portions constituting the first lenticular lens screen, the following equations are satisfied:

$$F = J \times H / (H-J)$$

$$G = L \times K / (K-L).$$

5. The head tracking stereoscopic display according to claim 3, wherein letting P be the pitch between the semi-cylindrical lens portions constituting the second lenticular lens screen, and Q be the pitch between the semi-cylindrical lens portions constituting the first lenticular lens screen, the following equations are satisfied:

$$P = 2 \times E \times J / (J+H)$$

$$Q = 2 \times K \times E \times J / (H \times (L+K)).$$

6. The head tracking stereoscopic display according to claim 3, wherein letting n be an integer, the pitch between the combining light sources satisfies $(n+\frac{1}{2}) \times S$.

7. A head tracking stereoscopic display comprising:

two one-eye systems each comprising light emitting means comprising a first light source comprised of a set of two line-shaped light sources and a second light source comprised of the other set of two line-shaped light sources, a diffusing screen provided on the light emission side of said light emitting means, a first lenticular lens screen provided between said diffusing screen and the light emitting means for focusing light from a selected one of the line-shaped light sources and alternately forming bright portions and dark portions on said diffusing screen by semi-cylindrical lens portions constituting the first lenticular lens screen, a second lenticular lens screen provided on the light emission side of said diffusing screen and having the function of taking each of said bright portions formed on the diffusing screen as a light source for either one of the eyes, and an image display panel provided on the light emission side of the second lenticular lens screen;

image supply means for fixedly displaying one of images and the other image which have binocular parallax, respectively, on the image display panel in one of the one-eye systems and the image display panel in the other one-eye system;

head position detection means for detecting the position of the head of a viewer; and control means for carrying out control to select light emission of the line-shaped light sources in said first and second light sources on the basis of information relating to the head position from said head position detection means, wherein said control means is constructed to carry out control, letting n be an integer, E be the distance between the eyes of the viewer, and A be the horizontal distance from the center of a stereoscopic position right in front of a screen, to select one of the line-shaped light sources in the first light source when the viewer is in an area indicated by $(2n-½) \times E \leq A \leq (2n+½) \times E$ on the basis of the center of the stereoscopic position right in front of the screen, while selecting the other line-shaped light source in the first light source when the viewer moves to an area indicated by $\{(2n+1)-½\} \times E < A < \{(2n+1)+½\} \times E$.

8. The head tracking stereoscopic display according to claim 7, wherein said control means is constructed to carry out control, letting n be an integer, E be the distance between the eyes of the viewer, and A be the horizontal distance from the center of a stereoscopic position right in front of a screen, to suitably select either one of the two line-shaped light sources in the second light source when the viewer moves to an area indicated by $\{(1+2n)/2-¼\} \times E < A < \{(1+2n)/2+¼\} \times E$ on the basis of the center of the stereoscopic position right in front of the screen.

9. A head tracking stereoscopic display comprising:

two one-eye systems each comprising light emitting means comprising a first light source comprised of a set of two line-shaped light sources and a second light source comprised of the other set of two line-shaped light sources, a diffusing screen provided on the light emission side of said light emitting means, a first lenticular lens screen provided between said diffusing screen and the light emitting means for focusing light from a selected one of the line-shaped light sources and alternately forming bright portions and dark portions on said diffusing screen by semi-cylindrical lens portions constituting the first lenticular lens screen, a second lenticular lens screen provided on the light emission side of said diffusing screen and having the function of taking each of said bright portions formed on the diffusing screen as a light source for either one of the eyes, and an image display panel provided on the light emission side of the second lenticular lens screen;

image supply means for fixedly displaying one of images and the other image which have binocular parallax, respectively, on the image display panel in one of the one-eye systems and the image display panel in the other one-eye system;

head position detection means for detecting the position of the head of a viewer; and control means for carrying out control to select light emission of the line-shaped light sources in said first and second light sources on the basis of information relating to the head position from said head position detection means, wherein letting E be the distance between the eyes of a viewer, and H be the distance between the viewer and the second lenticular lens screen, J be the distance between the second lenticular lens screen and the diffusing screen, L be the distance between the diffusing screen and the first lenticular lens screen, and K be the distance between the first lenticular lens screen and the light emitting means in each of the one-eye systems, the pitch S between the line-shaped light sources in each of the light sources satisfies the following equation:

$$S = K \times E \times J / (L \times H).$$

10. The head tracking stereoscopic display according to claim 9, wherein letting F be the focal length of each of the semi-cylindrical lens portions constituting the second lenticular lens screen, and G be the focal length of each of semi-cylindrical lens portions constituting the first lenticular lens screen in each of the one-eye systems, the following equations are satisfied:

$$F = J \times H / (H-J)$$

$$G = L \times K / (K-L).$$

11. The head tracking stereoscopic display according to claim 9, wherein letting P be the pitch between the semi-cylindrical lens portions constituting the second lenticular lens screen, and Q be the pitch between the semi-cylindrical lens portions constituting the first lenticular lens screen in each of the one-eye systems, the following equations are satisfied:

$$P = 2 \times E \times J / (J+H)$$

$$Q = 2 \times K \times E \times J / (H \times (L+K)).$$

12. The head tracking stereoscopic display according to claim 9, wherein letting n be an integer, the pitch between the light sources satisfies $(n+½) \times S$.

13. A head tracking stereoscopic display comprising:

two one-eye systems each comprising light emitting means comprising a line-shaped light source for a first area and a line-shaped light source for a second area in a position shifted by approximately E/2 (E is the distance between the eyes of a viewer) in the horizontal direction from the first areas, a diffusing screen provided on the light emission side of said light emitting means, a first lenticular lens screen provided between said diffusing screen and the light emitting means for focusing light from a selected one of the line-shaped light sources and alternately forming bright portions and dark portions on said diffusing screen by semi-cylindrical lens portions constituting the first lenticular lens screen, a second lenticular lens screen provided on the light emission side of said diffusing screen and having the function of taking each of said bright portions formed on the diffusing screen as a light source for either one of the eyes, and an image display panel provided on the light emission side of the second lenticular lens screen;

image supply means for respectively displaying one of images and the other image which have binocular parallax on the image display panel in one of the one-eye systems and the image display panel in the other one-eye system so as to be switchable;

head position detection means for detecting the position of the head of the viewer; and control means for carrying out control to select light emission of the line-shaped light sources and switch the images displayed on said image display panel on the basis of information relating to the head position from said head position detection means, wherein said control means is constructed to carry out control, letting n be an integer, E be the distance between the eyes of the viewer, and A be the horizontal distance from the center of a stereoscopic position right in front of a screen, to select the line-shaped light source for the first area when the viewer is in an area indicated by $(2n-½)\times E \leq A \leq (2n+½)\times E$ on the basis of the center of the stereoscopic position right in front of the screen, while selecting the line-shaped light source for the first area and switching the images displayed on said image display panel when the viewer moves to an area indicated by $\{(2n+1)-½\}\times E < A < \{(2n+1)+½\}\times E$.

14. The head tracking stereoscopic display according to claim 13, wherein said control means is constructed to carry out control, letting n be an integer, E be the distance between the eyes of the viewer, and A be the horizontal distance from the center of a stereoscopic position right in front of a screen, to select the line-shaped light source for the second area and suitably switch the images displayed on said image display panel when the viewer moves to an area indicated by $\{(1+2n)/2-¼\}\times E < A < \{(1+2n)/2+¼\}\times E$ on the basis of the center of the stereoscopic position right in front of the screen.

15. A head tracking stereoscopic display comprising:

two one-eye systems each comprising light emitting means comprising a line-shaped light source for a first area and a line-shaped light source for a second area in a position shifted by approximately E/2 (E is the distance between the eyes of a viewer) in the horizontal direction from the first area, a diffusing screen provided on the light emission side of said light emitting means, a first lenticular lens screen provided between said diffusing screen and the light emitting means for focusing light from a selected one of the line-shaped light sources and alternately forming bright portions and dark portions on said diffusing screen by semi-cylindrical lens portions constituting the first lenticular lens screen, a second lenticular lens screen provided on the light emission side of said diffusing screen and having the function of taking each of said bright portions formed on the diffusing screen as a light source for either one of the eyes, and an image display panel provided on the light emission side of the second lenticular lens screen;

image supply means for respectively displaying one of images and the other image which have binocular parallax on the image display panel in one of the one-eye systems and the image display panel in the other one-eye system so as to be switchable;

head position detection means for detecting the position of the head of the viewer; and control means for carrying out control to select light emission of the line-shaped light sources and switch the images displayed on said image display panel on the basis of information relating to the head position from said head position detection means, wherein letting E be the distance between the eyes of the viewer, and letting H be the distance between the viewer and the second lenticular lens screen, J be the distance between the second lenticular lens screen and the diffusing screen, L be the distance between the diffusing screen and the first lenticular lens screen, and K be the distance between the first lenticular lens screen and the light emitting means in each of the one-eye systems, the width M of each of the line-shaped light sources satisfies the following equation:

$$M = K \times E \times J/(L \times H).$$

16. The head tracking stereoscopic display according to claim 15, wherein letting F be the focal length of each of the semi-cylindrical lens portions constituting the second lenticular lens screen, and G be the focal length of each of the semi-cylindrical lens portions constituting the first lenticular lens screen in each of the one-eye systems, the following equations are satisfied:

$$F = J \times H/(H-J)$$

$$G = L \times K/(K-L).$$

17. The head tracking stereoscopic display according to claim 15, wherein letting P be the pitch between the semi-cylindrical lens portions constituting the second lenticular lens screen, and Q be the pitch between the semi-cylindrical lens portions constituting the first lenticular lens screen in each of the one-eye systems, the following equations are satisfied:

$$P = 2 \times E \times J/(J+H)$$

$$Q = 2 \times K \times E \times J/(H \times (L+K)).$$

18. The head tracking stereoscopic display according to claim 15, wherein letting n be an integer, the pitch between the line-shaped light sources satisfies $(n+½)\times M$.

19. A head position detecting device comprising:

light receiving means constructed by arranging a first light receiving device for a stereoscopic area and a second light receiving device for a pseudostereoscopic area in the horizontal direction, lens means for respectively introducing light reflected from the face of a viewer positioned in the stereoscopic area and light reflected from the face of the viewer positioned in the pseudostereoscopic area into said first light receiving device and said second light receiving device; and judgment means for comparing the amount of the light detected in said first light receiving device and the amount of the light detected in said second light receiving device, to judge which of the stereoscopic area and the pseudostereoscopic area is an area where the viewer is positioned.

20. The head position detecting device according to claim 19, wherein letting E be the distance between the eyes, A1 be the distance between said lens means and the viewer, B1 be the distance between said lens means and said light receiving means, and P1 be the pitch between the first light receiving device and the second light receiving device, the following equation is satisfied:

$$P1 = E \times B1/A1.$$

21. The head position detecting device according to claim 19, wherein letting E be the distance between the eyes of the viewer, A1 be the distance between said lens means and the viewer, B1 be the distance between said lens means and said light receiving means, and Q1 be the pitch between the lens means, the following equation is satisfied:

$$Q1=2\times E\times B1/(A1+B1).$$

22. The head position detecting device according to claim 19, wherein
letting E be the distance between the eyes of the viewer, A1 be the distance between said lens means and the viewer, B1 be the distance between said lens means and said light receiving means, and F1 be the focal length of said lens means, the following equation is satisfied:

$$F1=A1\times B1/(A1+B1).$$

23. The head position detecting device according to claim 19, wherein
a plurality of lens means are arranged in the horizontal direction.

24. The head position detecting device according to claim 23, wherein
a lenticular lens is used as the plurality of lens means arranged in the horizontal direction.

25. A head position detecting device comprising:
light receiving means constructed by arranging a first light receiving device for a stereoscopic area, a second light receiving device for a pseudostereoscopic area, a third light receiving device for a first crosstalk area, and a fourth light receiving device for a second crosstalk area in the horizontal direction;
lens means for respectively introducing light reflected from the face of a viewer positioned in the stereoscopic area, light reflected from the face of the viewer positioned in the pseudostereoscopic area, light reflected from the face of the viewer positioned in the first crosstalk area, and light reflected from the face of the viewer positioned in the second crosstalk area into said first light receiving device, said second light receiving device, said third light receiving device, and said fourth light receiving device; and
judgment means for comparing the amount of the light detected in said first light receiving device, the amount of the light detected in said second light receiving device, the amount of the light detected in said third light receiving device, and the amount of the light detected in said fourth light receiving device, to judge which of the stereoscopic area, the pseudostereoscopic area, the first crosstalk area, and the second crosstalk area is an area where the viewer is positioned.

26. The head position detecting device according to claim 25, wherein
letting E be the distance between the eyes of the viewer, A2 be the distance between said lens means and the viewer, B2 be the distance between said lens means and said light receiving means, and P2 be the pitch between the light receiving devices, the following equation is satisfied:

$$P2=E\times B2/(2\times A2).$$

27. The head position detecting device according to claim 25, wherein
letting E be the distance between the eyes of the viewer, A2 be the distance between said lens means and the viewer, B2 be the distance between said lens means and said light receiving means, and Q2 be the pitch between the lens means, the following equation is satisfied:

$$Q2=2\times E\times B2/(A2+B2).$$

28. The head position detecting device according to claim 25, wherein
letting E be the distance between the eyes of the viewer, A2 be the distance between said lens means and the viewer, B2 be the distance between said lens means and said light receiving means, and F2 be the focal length of said lens means, the following equation is satisfied:

$$F2=A2\times B2/(A2+B2).$$

29. The head position detecting device according to claim 25, wherein
a plurality of lens means are arranged in the horizontal direction.

30. The head position detecting device according to claim 29, wherein
a lenticular lens is used as the plurality of lens means arranged in the horizontal direction.

31. A head tracking stereoscopic display comprising:
a head position detecting device comprising
light receiving means constructed by arranging a first light receiving device for a stereoscopic area and a second light receiving device for a pseudostereoscopic area in the horizontal direction,
lens means for respectively introducing light reflected from the face of a viewer positioned in the stereoscopic area and light reflected from the face of the viewer positioned in the pseudostereoscopic area into said first light receiving device and said second light receiving device, and
judgment means for comparing the amount of the light detected in said first light receiving device and the amount of the light detected in said second light receiving device, to judge which of the stereoscopic area and the pseudostereoscopic area is an area where the viewer is positioned,
the head tracking stereoscopic display being constructed to respectively introduce a right eye image and a left eye image to the right eye and the left eye of the viewer positioned in the stereoscopic area when a signal indicating that the viewer is positioned in the stereoscopic area is obtained in said head position detecting device, and constructed to respectively introduce the right eye image and the left eye image to the right eye and the left eye of the viewer positioned in the pseudostereoscopic area when a signal indicating that the viewer is positioned in the pseudostereoscopic area is obtained.

32. A head tracking stereoscopic display comprising:
a head position detecting device comprising
light receiving means constructed by arranging a first light receiving device for a stereoscopic area, a second light receiving device for a pseudostereoscopic area, a third light receiving device for a first crosstalk area, and a fourth light receiving device for a second crosstalk area in the horizontal direction,
lens means for respectively introducing light reflected from the face of a viewer positioned in the stereoscopic area, light reflected from the face of the viewer positioned in the pseudostereoscopic area, light reflected from the face of the viewer positioned in the first crosstalk area, and light reflected from the face of the viewer positioned in the second crosstalk area into said first light receiving device, said second light receiving device, said third light receiving device, and said fourth light receiving device, and judgment means for comparing the amount of the light detected in said first light receiving device, the amount of the light detected in said second light receiving device, the amount of the light detected in said third light receiving device, and the amount of the light detected in said fourth light receiving device, to judge which of the stereoscopic area, the pseudostereoscopic area, the first crosstalk area, and the second crosstalk area is an area where the viewer is positioned, the head tracking stereoscopic display being constructed to respectively introduce a right eye image and a left eye image to the right eye and the left eye of the viewer positioned in the stereoscopic area when a signal indicating that the viewer is positioned in the stereoscopic area is obtained in said head position detecting device, constructed to respectively introduce the right eye image and the left eye image to the right eye and the left eye of the viewer positioned in the pseudostereoscopic area when a signal indicating that the viewer is positioned in the pseudostereoscopic area is obtained, constructed to respectively introduce a right eye image and a left eye image to the right eye and the left eye of the viewer positioned in the first crosstalk area when a signal indicating that the viewer is positioned in the first crosstalk area is obtained, and constructed to respectively introduce the right eye image and the left eye image to the right eye and the left eye of the viewer positioned in the second crosstalk area when a signal indicating that the viewer is positioned in the second crosstalk area is obtained.

* * * * *